(12) United States Patent
Cai et al.

(10) Patent No.: US 10,305,783 B2
(45) Date of Patent: May 28, 2019

(54) PACKET CONTROL METHOD, SWITCH, AND CONTROLLER

(71) Applicant: Huawei Technologies Co., Ltd., Shenzhen (CN)

(72) Inventors: Hui Cai, Shenzhen (CN); Weiqi Hu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 171 days.

(21) Appl. No.: 15/421,667

(22) Filed: Feb. 1, 2017

(65) Prior Publication Data

US 2017/0142000 A1     May 18, 2017

Related U.S. Application Data

(63) Continuation of application No. PCT/CN2014/084084, filed on Aug. 11, 2014.

(51) Int. Cl.
*H04L 12/761* (2013.01)
*H04L 29/06* (2006.01)
(Continued)

(52) U.S. Cl.
CPC ............. *H04L 45/16* (2013.01); *H04L 29/06* (2013.01); *H04L 45/64* (2013.01); *H04L 45/745* (2013.01)

(58) Field of Classification Search
CPC ......... H04L 45/16; H04L 29/06; H04L 45/64; H04L 45/745
See application file for complete search history.

(56) References Cited

U.S. PATENT DOCUMENTS

2012/0044813 A1* 2/2012 Nandagopal ............ H04L 45/28
370/242
2012/0079478 A1* 3/2012 Galles ..................... H04L 47/10
718/1
(Continued)

FOREIGN PATENT DOCUMENTS

CN     1612562 A     5/2005
CN     103761060 A   4/2014
(Continued)

OTHER PUBLICATIONS

Open Networking Foundation, "OpenFlow Switch Specification", Version 1.4.0 (Wire Protocol 0x05), XP55322618, Oct. 14, 2013, 206 pages.

*Primary Examiner* — Ajay Cattungal
(74) *Attorney, Agent, or Firm* — Slater Matsil, LLP

(57) ABSTRACT

The embodiments disclose a packet control method, a switch, and a controller. The method includes receiving, by a switch, a packet, and processing the packet according to a pipeline, where an original packet is stored in a buffer, and a buffer location of the original packet is identified by using a buffer identifier. The method also includes when the packet fails to match a flow table, sending, by the switch, a first packet message to a controller, where the first packet message carries the buffer identifier, all or partial content of the packet; receiving, a second packet message sent by the controller, where the second packet message carries the buffer identifier and a packet processing instruction, and the packet processing instruction includes indication information of a specified flow table. Additionally, the method includes reprocessing, the packet according to the packet processing instruction and starting at the specified flow table.

20 Claims, 17 Drawing Sheets

(51) Int. Cl.
*H04L 12/741* (2013.01)
*H04L 12/715* (2013.01)

(56) References Cited

U.S. PATENT DOCUMENTS

| | | | | |
|---|---|---|---|---|
| 2012/0155467 A1* | 6/2012 | Appenzeller | ........... | H04L 45/54 370/392 |
| 2013/0114615 A1* | 5/2013 | Suemitsu | ............ | H04L 47/2441 370/401 |
| 2013/0163427 A1* | 6/2013 | Beliveau | ............... | H04L 67/327 370/235 |
| 2013/0163475 A1* | 6/2013 | Beliveau | ............... | H04L 67/327 370/257 |
| 2013/0170435 A1* | 7/2013 | Dinan | ..................... | H04L 45/50 370/328 |
| 2013/0230047 A1* | 9/2013 | Subrahmaniam | ... | H04L 47/2441 370/392 |
| 2013/0308645 A1* | 11/2013 | Karino | .................... | H04L 47/10 370/392 |
| 2013/0308651 A1* | 11/2013 | Ding | ..................... | H04L 45/021 370/401 |
| 2014/0016647 A1* | 1/2014 | Yoshida | ............. | H04L 12/4666 370/395.53 |
| 2014/0098669 A1* | 4/2014 | Garg | ....................... | H04L 47/12 370/235 |
| 2014/0173104 A1* | 6/2014 | Zhou | ..................... | H04L 43/026 709/224 |
| 2014/0247725 A1* | 9/2014 | Torigoe | ............... | H04L 12/2874 370/235 |
| 2015/0052576 A1* | 2/2015 | Togawa | .............. | H04L 63/0227 726/1 |
| 2015/0131666 A1* | 5/2015 | Kang | .................... | H04L 45/745 370/392 |
| 2015/0163144 A1* | 6/2015 | Koponen | ............. | H04L 47/125 370/237 |
| 2015/0169451 A1* | 6/2015 | Jackson | .............. | G06F 12/0895 711/135 |
| 2015/0169457 A1* | 6/2015 | Jackson | ................ | G06F 12/121 711/135 |
| 2015/0334090 A1* | 11/2015 | Ling | ................... | H04L 63/0254 726/13 |
| 2016/0134534 A1* | 5/2016 | Tan | ......................... | H04L 45/02 370/392 |
| 2016/0315847 A1* | 10/2016 | Zhang | ................ | H04L 12/6418 370/392 |
| 2016/0330045 A1* | 11/2016 | Tang | .................... | H04L 12/462 |

FOREIGN PATENT DOCUMENTS

CN 103763367 A 4/2014
WO 2014057375 A2 4/2014

* cited by examiner

PACKET CONTROL METHOD, SWITCH, AND CONTROLLER

CROSS-REFERENCE TO RELATED APPLICATIONS

This application is a continuation of International Patent Application No. PCT/CN2014/084084 filed on Aug. 11, 2014, the disclosure of which is hereby incorporated by reference in its entirety.

TECHNICAL FIELD

The present embodiments relate to the field of communications technologies, and in particular, to a packet control method, a switch, and a controller.

BACKGROUND

To achieve flexible and manageable deployment of a network element, a software-defined networking (SDN) concept is proposed in the industry. In SDN, control logic and a forwarding function of network elements are decoupled, and the control logic is centrally deployed. A control-plane device whose control logic is centrally deployed is operated, so that network control and maintenance can be easily performed, network management efficiency is improved, and a forwarding-plane device is simplified and generalized. The OpenFlow protocol is a typical technology in an SDN.

Network elements in the OpenFlow protocol include a controller and a Switch. The controller is responsible for determining, according to a feature of a packet, a forwarding action of the service flow, and delivering a corresponding flow rule and a corresponding action to the switch. The switch obtains and stores the flow rule, and performs the corresponding action on a subsequent packet that complies with the flow rule, so as to forward or process the packet. In a scenario in which a packet fails to match a flow entry, the switch may report the event to the controller by using a first packet message Packet_in, and the controller sends a processing action of the packet to the switch by using a second packet message Packet_out. Currently, there are three manners in which the switch processes a Packet_out message. In a first manner, the Switch performs matching, starting at a flow table at a first level, on a packet carried in the Packet_out message, and performs flow table-based pipeline processing on the packet. In a second manner, the controller adds, into the Packet_out message, a location of a flow table that causes Packet_in, and the switch processes a packet according to a value of the location of the flow table and starting at a specified flow table. In a third manner, the Packet_out message carries an action set for processing a packet, and the switch processes the packet according to the action set without a need to perform matching by using a pipeline.

However, in the foregoing three manners, the switch totally processes a packet according to an instruction of the controller, and when a modified packet still needs to be submitted to a control plane for processing, and is subsequently returned by the controller to the switch for processing, information is lost due to the previous modification.

SUMMARY

To resolve a main technical problem, the present embodiments provide a packet control method, a switch, and a controller, so that the switch can flexibly process a packet according to an instruction of the controller.

According to a first aspect, the present embodiments provide a packet control method, where the method includes receiving, by a switch, a packet, and processing the packet according to a pipeline, where original content of the packet is an original packet, the original packet is stored in a buffer, and a buffer location of the original packet is identified by using a buffer identifier. The method also includes when the packet fails to match a flow table, sending, by the switch, a first packet message Packet_in to a controller, where the first packet message is used to report information about the packet to the controller, and request the controller to determine a processing method for the packet, and the first packet message carries the buffer identifier, all or partial content of the packet, an input port number, and information obtained in a process of processing the packet. Additionally, the method includes receiving, by the switch, a second packet message Packet_out sent by the controller, where the second packet message is used to deliver, to the switch, a packet processing instruction for processing the packet, the second packet message carries the buffer identifier and the packet processing instruction, the packet processing instruction includes indication information of a specified flow table, and the specified flow table is a start flow table that is in the pipeline and is used by the switch for reprocessing the packet. Also, the method includes reprocessing, by the switch, the packet according to the packet processing instruction and starting at the specified flow table.

In a first possible implementation manner of the first aspect, the method further includes: storing, by the switch, the original packet into the buffer, and generating the buffer identifier, where the buffer identifier is used to identify the buffer location of the original packet; the buffer identifier is carried in messages in the process of processing the packet according to a flow table.

With reference to the first possible implementation manner of the first aspect, in a second possible implementation manner of the first aspect, before the step of storing, by the switch, the packet into the buffer, the method includes: receiving, by the switch, a buffer instruction sent by the controller, where the buffer instruction requests the switch to store the original content that is of the packet and is specified by the controller.

With reference to any one of the first aspect, or the first to the second possible implementation manners of the first aspect, in a third possible implementation manner of the first aspect, before the step of sending, by the switch, a first packet message Packet_in to a controller, the method includes: receiving, by the switch, a carry original packet instruction sent by the controller, where the carry original packet instruction instructs the switch to add the original packet into the first packet message when the switch sends the first packet message; and adding, by the switch, all of the original packet, a part of the original packet, or a transformation of the original packet into the first packet message, and sending the first packet message to the controller.

With reference to any one of the first aspect, or the first to the third possible implementation manners of the first aspect, in a fourth possible implementation manner of the first aspect, the step of reprocessing, by the switch, the packet according to the packet processing instruction and starting at the specified flow table includes: obtaining, by the switch, the original packet by using the buffer identifier; and reprocessing, by the switch, the obtained original packet according to the packet processing instruction and starting at a flow table at a first level, where the specified flow table is at the first level in the pipeline.

With reference to the first aspect, or the first to the third possible implementation manners of the first aspect, in a fifth possible implementation manner of the first aspect, the step of the reprocessing, by the switch, the packet according to the packet processing instruction and starting at the specified flow table includes: obtaining, by the switch, a flow table identifier table_id of a current flow table for the original packet in the processing process by using the buffer identifier; obtaining, by the switch from the buffer, a current packet obtained after the original packet is processed; and sending, by the switch according to the packet processing instruction, the current packet to a location that is in the pipeline and is indicated by the flow table identifier table id of the current flow table, so as to continue to perform processing, where the specified flow table is a flow table identified by the flow table identifier table_id.

With reference to the fifth possible implementation manner of the first aspect, in a sixth possible implementation manner of the first aspect, the method further includes: recording, by the switch in the process of processing the packet, the flow table identifier table_id of the current flow table for the packet in the processing process according to a preset requirement; and storing, by the switch into the buffer in which the buffer identifier has already been generated, the flow table identifier table_id of the current flow table for the packet in the processing process.

With reference to any one of the first aspect, or the second to the sixth possible implementation manners of the first aspect, in a seventh possible implementation manner of the first aspect, before the step of receiving, by the switch, a second packet message Packet_out sent by the controller, the method further includes: receiving, by the switch, an instruction of the controller for performing an addition, deletion, or modification operation on the flow entry, and performing the addition, deletion, or modification operation on the flow entry according to the instruction.

With reference to any one of the first aspect, or the second to the seventh possible implementation manners of the first aspect, in an eighth possible implementation manner of the first aspect, the step of sending, by the switch, a first packet message Packet_in to a controller includes: sending, by the switch, the first packet message Packet_in to the controller, where a Packet_id field of the first packet message stores the buffer identifier.

With reference to any one of the first aspect, or the second to the seventh possible implementation manners of the first aspect, in a ninth possible implementation manner of the first aspect, the step of sending, by the switch, a first packet message Packet_in to a controller includes: sending, by the switch, the first packet message Packet_in to the controller, where a Buffer_id field of the first packet message stores the buffer identifier.

According to a second aspect, the present embodiments provide a packet control method, where the method includes receiving, by a controller, a first packet message Packet_in sent by a switch, where the first packet message is used to report information about a packet to the controller, and request the controller to determine a processing method for the packet, the first packet message carries a buffer identifier, all or partial content of the packet, an input port number, and information obtained in a process of processing the packet, original content of the packet is an original packet, and the buffer identifier is used to identify a buffer location of the original packet. The method also includes performing, by the controller, analysis processing on the information about the packet, so as to generate a packet processing instruction. Additionally, the method includes sending, by the controller, a second packet message Packet_out to the switch, where the second packet message is used to deliver, to the switch, the packet processing instruction for processing the packet, the second packet message carries the buffer identifier and the packet processing instruction, the packet processing instruction includes indication information of a specified flow table, and the specified flow table is a start flow table that is in a pipeline and is used by the switch for reprocessing the packet.

In a first possible implementation manner of the second aspect, before the step of receiving, by a controller, a first packet message Packet_in sent by a switch, the method includes: sending, by the controller, a buffer instruction to the controller, where the buffer instruction instructs the switch to store the original content that is of the packet and is specified by the controller.

In a second possible implementation manner of the second aspect, before the step of sending, by the controller, a second packet message Packet_out to the switch, the method includes: sending, by the controller to the switch, an instruction for performing an addition, deletion, or modification operation on the flow entry.

In a third possible implementation manner of the second aspect, before the step of receiving, by a controller, a first packet message Packet_in sent by a switch, the method includes: sending, by the controller, a carry original packet instruction to the switch, where the carry original packet instruction instructs the switch to add the original packet into the first packet message when the switch sends the first packet message.

According to a third aspect, the present embodiments provide a switch, where the switch includes: a first receiving module, a processing module, a sending module, a second receiving module, and a reprocessing module, where the first receiving module is configured to receive a packet, where original content of the packet is an original packet, the original packet is stored in a buffer, and a buffer location of the original packet is identified by using a buffer identifier; the processing module is configured to process the packet according to a pipeline; the sending module is configured to: when the packet fails to match a flow table, send a first packet message Packet_in to a controller, where the first packet message is used to report information about the packet to the controller, and request the controller to determine a processing method for the packet, and the first packet message carries the buffer identifier, all or partial content of the packet, an input port number, and information obtained in a process of processing the packet; the second receiving module is configured to receive a second packet message Packet_out sent by the controller, where the second packet message is used to deliver, to the switch, a packet processing instruction for processing the packet, the second packet message carries the buffer identifier and the packet processing instruction, the packet processing instruction includes indication information of a specified flow table, and the specified flow table is a start flow table that is in the pipeline and is used by the switch for reprocessing the packet; and the reprocessing module is configured to reprocess the packet according to the packet processing instruction and starting at the specified flow table.

In a first possible implementation manner of the third aspect, the switch further includes a storage module, where the storage module is configured to: store the original packet into the buffer, and generate the buffer identifier, where the buffer identifier is used to identify the buffer location of the original packet, the buffer identifier is carried in messages in the process of processing the packet according to a flow table.

With reference to the first possible implementation manner of the third aspect, in a second possible implementation manner of the third aspect, the switch further includes a third receiving module, and the third receiving module is configured to receive a buffer instruction sent by the controller, where the buffer instruction requests the switch to store the original content that is of the packet and is specified by the controller.

With reference to any one of the third aspect, or the first to the second possible implementation manners of the third aspect, in a third possible implementation manner of the third aspect, the switch further includes a fourth receiving module, and the fourth receiving module is configured to receive a carry original packet instruction sent by the controller, where the carry original packet instruction instructs the switch to add the original packet into the first packet message when the switch sends the first packet message; and the sending module is further configured to: add all of the original packet, a part of the original packet, or a transformation of the original packet into the first packet message, and send the first packet message to the controller.

With reference to any one of the third aspect, or the first to the third possible implementation manners of the third aspect, in a fourth possible implementation manner of the third aspect, the reprocessing module includes a first obtaining unit and a first reprocessing unit, where the first obtaining unit is configured to obtain the original packet by using the buffer identifier; and the first reprocessing unit is configured to reprocess, according to the packet processing instruction and starting at a flow table at a first level, the original packet obtained by the first obtaining unit, where the specified flow table is at the first level in the pipeline.

With reference to any one of the third aspect, or the first to the third possible implementation manners of the third aspect, in a fifth possible implementation manner of the third aspect, the reprocessing module includes: a second obtaining unit, a third obtaining unit, and a second reprocessing unit, where the second obtaining unit is configured to obtain a flow table identifier table_id of a current flow table for the original packet in the processing process by using the buffer identifier; the third obtaining unit is configured to obtain, from the buffer, a current packet obtained after the original packet is processed; and the second reprocessing unit is configured to send, according to the packet processing instruction, the current packet to a location that is in the pipeline and is indicated by the flow table identifier table id of the current flow table, so as to continue to perform processing, where the specified flow table is a flow table identified by the flow table identifier table_id.

With reference to the fifth possible implementation manner of the third aspect, in a sixth possible implementation manner of the third aspect, the switch further includes a record module, and the record module is configured to record, in the process of processing the packet, the flow table identifier table_id of the current flow table for the packet in the processing process according to a preset requirement; and the storage module is further configured to store, into the buffer in which the buffer identifier has already been generated, the flow table identifier table_id of the current flow table for the packet in the processing process.

With reference to any one of the third aspect, or the first to the sixth possible implementation manners of the third aspect, in a seventh possible implementation manner of the third aspect, the switch further includes a fifth receiving module and an operation module, where the fifth receiving module is configured to receive an instruction of the controller for performing an addition, deletion, or modification operation on the flow entry; and the operation module is configured to perform the addition, deletion, or modification operation on the flow entry according to the instruction.

With reference to any one of the third aspect, or the first to the seventh possible implementation manners of the third aspect, in an eighth possible implementation manner of the third aspect, the sending module is specifically configured to send the first packet message Packet_in to the controller, where a Packet_id field of the first packet message stores the buffer identifier.

With reference to any one of the third aspect, or the first to the eighth possible implementation manners of the third aspect, in a ninth possible implementation manner of the third aspect, the sending module is specifically configured to send the first packet message Packet_in to the controller, where a Buffer_id field of the first packet message stores the buffer identifier.

According to a fourth aspect, the present embodiments provide a controller, where the control includes: a receiving module, a processing module, and a first sending module, where the receiving module is configured to receive a first packet message Packet_in sent by a switch, where the first packet message is used to report information about a packet to the controller, and request the controller to determine a processing method for the packet, the first packet message carries a buffer identifier, all or partial content of the packet, an input port number, and information obtained in a process of processing the packet, original content of the packet is an original packet, and the buffer identifier is used to identify a buffer location of the original packet; the processing module is configured to perform analysis processing on the information about the packet, so as to generate a packet processing instruction; and the first sending module is configured to send a second packet message Packet_out to the switch, where the second packet message is used to deliver, to the switch, the packet processing instruction for processing the packet, the second packet message carries the buffer identifier and the packet processing instruction, the packet processing instruction includes indication information of a specified flow table, and the specified flow table is a start flow table that is in a pipeline and is used by the switch for reprocessing the packet.

In a first possible implementation manner of the fourth aspect, the controller further includes a second sending module, and the second sending module is configured to send a buffer instruction to the controller, where the buffer instruction instructs the switch to store the original content that is of the packet and is specified by the controller.

In a second possible implementation manner of the fourth aspect, the controller further includes a third sending module, and the third sending module is configured to send, to the switch, an instruction for performing an addition, deletion, or modification operation on the flow entry.

In a third possible implementation manner of the fourth aspect, the controller further includes a fourth sending module, and the fourth sending module is configured to send a carry original packet instruction to the switch, where the carry original packet instruction instructs the switch to add the original packet into the first packet message when the switch sends the first packet message.

According to a fifth aspect, the present embodiments provide a switch, where the switch includes: a processor, and a memory, a receiver, and a transmitter that are coupled to the processor, where the receiver is configured to receive a packet, where original content of the packet is an original packet; the memory is configured to: store the original packet, and identify a buffer location of the original packet by using a buffer identifier, and the memory is further configured to store a flow table; the processor is configured to process the packet according to a pipeline; the transmitter is configured to: when the packet fails to match a flow table, send a first packet message Packet_in to a controller, where the first packet message is used to report information about the packet to the controller, and request the controller to determine a processing method for the packet, and the first packet message carries the buffer identifier, all or partial content of the packet, an input port number, and information obtained in a process of processing the packet; the receiver is configured to: receive a second packet message Packet_out sent by the controller, where the second packet message is used to deliver, to the switch, a packet processing instruction for processing the packet, the second packet message carries the buffer identifier and the packet processing instruction, the packet processing instruction includes indication information of a specified flow table, and the specified flow table is a start flow table that is in the pipeline and is used by the switch for reprocessing the packet; and store the packet processing instruction into the memory; and the processor is configured to: obtain the packet processing instruction by invoking the memory, and reprocess the packet according to the packet processing instruction and starting at the specified flow table.

According to a sixth aspect, the present embodiments provide a controller, where the controller includes a processor, and a memory, a receiver, and a transmitter that are coupled to the processor, where the receiver is configured to: receive a first packet message Packet_in sent by a switch, and store the first packet message Packet_in into the memory, where the first packet message is used to report information about a packet to the controller, and request the controller to determine a processing method for the packet, the first packet message carries a buffer identifier, all or partial content of the packet, an input port number, and information obtained in a process of processing the packet, original content of the packet is an original packet, and the buffer identifier is used to identify a buffer location of the original packet; the processor is configured to: obtain, by invoking the memory, the information that is about the packet and is carried in the first packet message Packet_in, and perform analysis processing on the information about the packet, so as to generate a packet processing instruction; and the transmitter is configured to send a second packet message Packet_out to the switch, where the second packet message is used to deliver, to the switch, the packet processing instruction for processing the packet, the second packet message carries the buffer identifier and the packet processing instruction, the packet processing instruction includes indication information of a specified flow table, and the specified flow table is a start flow table that is in a pipeline and is used by the switch for reprocessing the packet.

In the embodiments, an original packet is stored in a buffer, and a buffer location of the original packet is identified by using a buffer identifier; when the packet fails to match a flow table, a first packet message sent by a switch to a controller carries the buffer identifier, a second packet message received by the switch carries the buffer identifier and a packet processing instruction, and the packet processing instruction includes indication information of a specified flow table; the switch reprocesses the packet according to the packet processing instruction and starting at the specified flow table. In this way, when requiring the original packet, the switch may obtain the original packet according to the buffer identifier, so that the switch can flexibly process the packet according to an instruction of the controller.

DETAILED DESCRIPTION OF ILLUSTRATIVE EMBODIMENTS

In the following, the present embodiments are described in detail with reference to the accompanying drawings and implementation manners.

Figure 1:
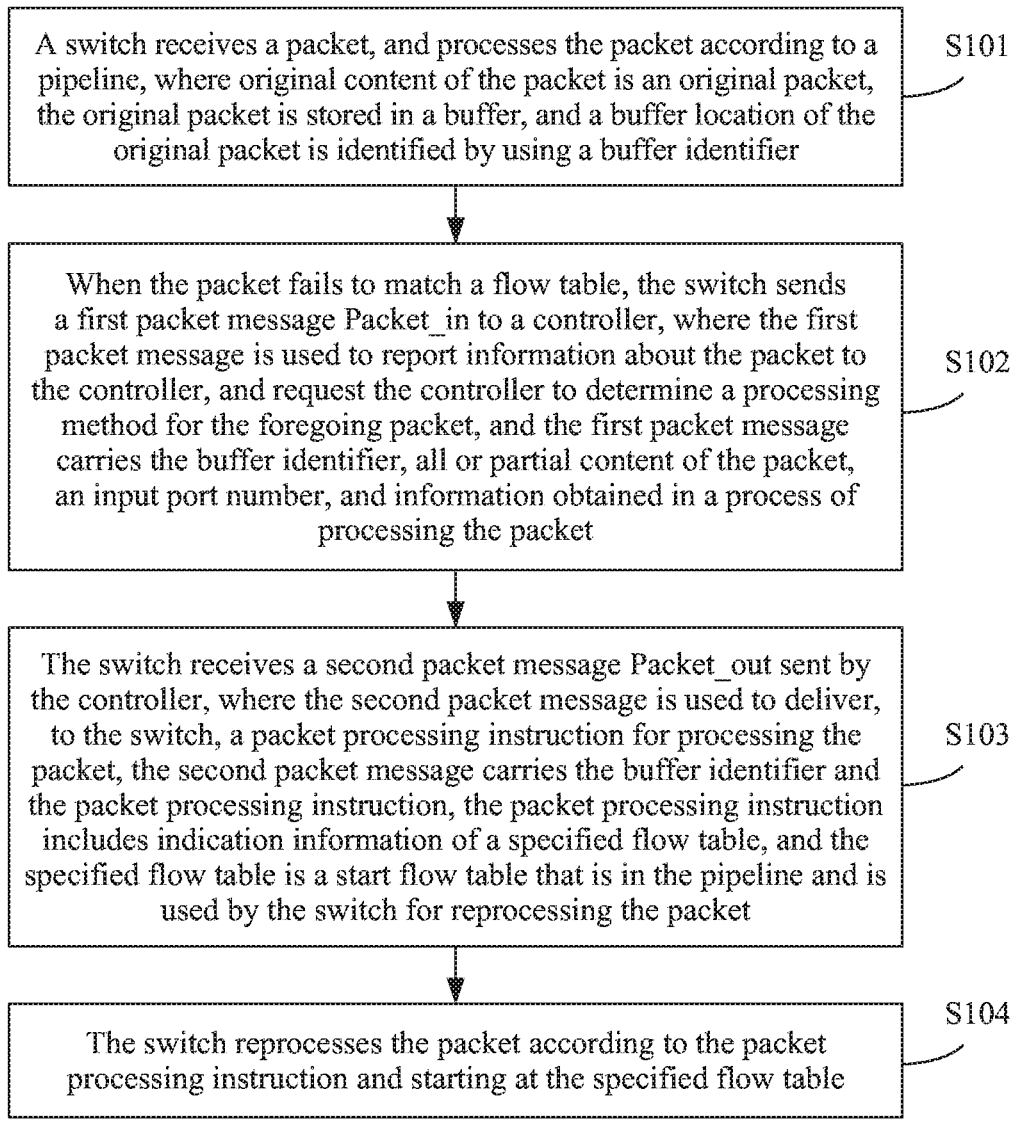
FIG. 1 is a flowchart of an implementation manner of a packet control method according to the present embodiments.

Referring to FIG. 1, FIG. 1 is a flowchart of an implementation manner of a packet control method according to the present embodiments. This implementation manner is a flowchart of a method at a switch end, and includes the following steps.

Step S101: A switch receives a packet, and processes the packet according to a pipeline, where original content of the packet is an original packet, the original packet is stored in a buffer, and a buffer location of the original packet is identified by using a buffer identifier.

The switch is a network device used for electrical signal forwarding, and the switch may provide an exclusive electrical signal channel for any two network nodes that access the switch. After receiving the packet, the switch processes the packet according to the pipeline. The original content of the packet is the original packet.

The original packet is not processed by the switch, and the original packet includes all information that is the most original and the most comprehensive. Information in the packet processed by the switch is partially changed by the switch, and is less comprehensive than information included in the original packet. The original packet is stored in the buffer, and the buffer identifier is used to identify the buffer location of the original packet, so that when the original packet is required, the original packet can be obtained from the buffer by using the buffer identifier.

The pipeline includes flow tables, a flow table includes many flow entries, and each flow entry is a forwarding rule. A destination port for forwarding a packet that enters the switch is obtained by querying a flow table. A flow entry includes header fields, counters, and actions. The header fields include an identifier of the flow entry. The counters are used to count statistical data of the flow entry. The actions indicate an operation that should be performed on a packet that matches the flow entry, and the operation includes a processing type and a relevant parameter. The processing type is, for example, forwarding, discarding, modification, encapsulation, or decapsulation. The header fields are also referred to as match fields and are used to match packet header content of the packet received by the switch. The matching specifically means matching information such as a packet header field and a receive port number with a specified value. The packet header field is, for example, an IP 5-tuple (a source IP address, a destination IP address, a protocol type, a source port number, and a destination port number of an IP packet), or various header fields (a source MAC address, a destination MAC address, and the like) in an Ethernet frame header. The matching herein may be exact matching, or may be mask matching.

The switch processes the packet according to the pipeline, for example, the switch performs matching starting at the first flow table; and if a flow entry is found by means of matching, the switch performs an instruction in the flow entry, and then, jumps to a next flow table to continue to perform a matching operation. If there is no flow entry that is in the flow table and matches the packet, the packet is discarded or forwarded to a controller for processing. If an instruction in a matching flow entry no longer instructs to jump to a next flow table, matching ends, and actions corresponding to the matching flow entry are performed, for example, to forward the packet to a specified output port, discard the packet, modify a packet header, and forward the packet to a group table.

Step S102: When the packet fails to match a flow table, the switch sends a first packet message Packet_in to a controller, where the first packet message is used to report information about the packet to the controller, and request the controller to determine a processing method for the packet, and the first packet message carries the buffer identifier, all or partial content of the packet, an input port number, and information obtained in a process of processing the packet.

The first packet message Packet_in refers to a message for reporting, by the switch, the information about the packet to the controller, and the information may be a packet processing success, a packet processing failure, a current processing state, or the like. In a scenario in which the packet fails to match a flow entry, the switch may report the event to the controller by using the first packet message Packet_in, and request the controller to determine the processing method for the packet. Alternatively, when the switch needs to send a message to the controller, the switch may report the event to the controller by using the first packet message Packet_in.

The first packet message carries the buffer identifier, and this helps the controller to add the buffer identifier into a second packet message when the controller sends the second packet message to the switch.

The first packet message further includes all or partial content of the packet, the input port number, and the information obtained in the process of processing the packet. All or partial content of the packet may be all content or partial content of the original packet, a modified packet, a modification record of the packet, and the like. The input port number is used to identify the switch. The information obtained during packet processing may be used to provide additional information to which the controller can make reference, and helps the controller to perform analysis processing on the packet.

The switch sends the first packet message Packet_in to the controller, and a Packet_id field of the first packet message stores the buffer identifier. In this way, functions of an existing Packet_id information element can be expanded.

The switch sends the first packet message Packet_in to the controller, and a Buffer_id field of the first packet message stores the buffer identifier. In this way, functions of an existing Buffer_id information element can be expanded.

Step S103: The switch receives a second packet message Packet_out sent by the controller, where the second packet message is used to deliver, to the switch, a packet processing instruction for processing the packet, the second packet message carries the buffer identifier and the packet processing instruction, the packet processing instruction includes indication information of a specified flow table, and the specified flow table is a start flow table that is in the pipeline and is used by the switch for reprocessing the packet.

The second packet message Packet_out is used by the controller for sending, to the switch, the packet processing instruction for processing the packet, and is a message in response to the first packet message Packet_in. The packet processing instruction includes the indication information of the specified flow table, and the specified flow table is the start flow table that is in the pipeline and is used by the switch for reprocessing the packet. For example, when the packet needs to be reprocessed, the specified flow table may be a flow table at a first level; when the packet needs to be processed starting at the flow table that the packet fails to match, the specified flow table may be the flow table that the packet fails to match. The packet processing instruction is carried in the second packet message. The first packet message Packet_in carries the buffer identifier, and the second packet message Packet_out is a message in response to the first packet message Packet_in, and also carries the buffer identifier, so that when requiring the original packet after receiving the second packet message Packet_out, the switch can obtain the original packet by using the buffer identifier.

Step S104: The switch reprocesses the packet according to the packet processing instruction and starting at the specified flow table.

When receiving the second packet message Packet_out, the switch may reprocess the packet starting at the specified flow table and according to the packet processing instruction carried in the second packet message Packet_out. The reprocessing may mean reprocessing the original packet, or may mean continuing to process a current packet starting at the flow table that the packet fails to match.

In this implementation manner of the present embodiments, a switch receives a packet, and processes the packet according to a pipeline, where an original packet is stored in a buffer, and a buffer location of the original packet is identified by using a buffer identifier; when the packet fails to match a flow table, the switch sends a first packet message Packet_in to a controller, where the first packet message carries the buffer identifier, all or partial content of the packet, an input port number, and information obtained in a process of processing the packet; the switch receives a second packet message Packet_out sent by the controller, where the second packet message carries the buffer identifier and a packet processing instruction, and the packet processing instruction includes indication information of a specified flow table; and the switch reprocesses the packet according to the packet processing instruction and starting at the specified flow table. In this way, when requiring the original packet, the switch may obtain the original packet according to the buffer identifier, so that the switch can flexibly process the packet according to an instruction of the controller.

Figure 2:
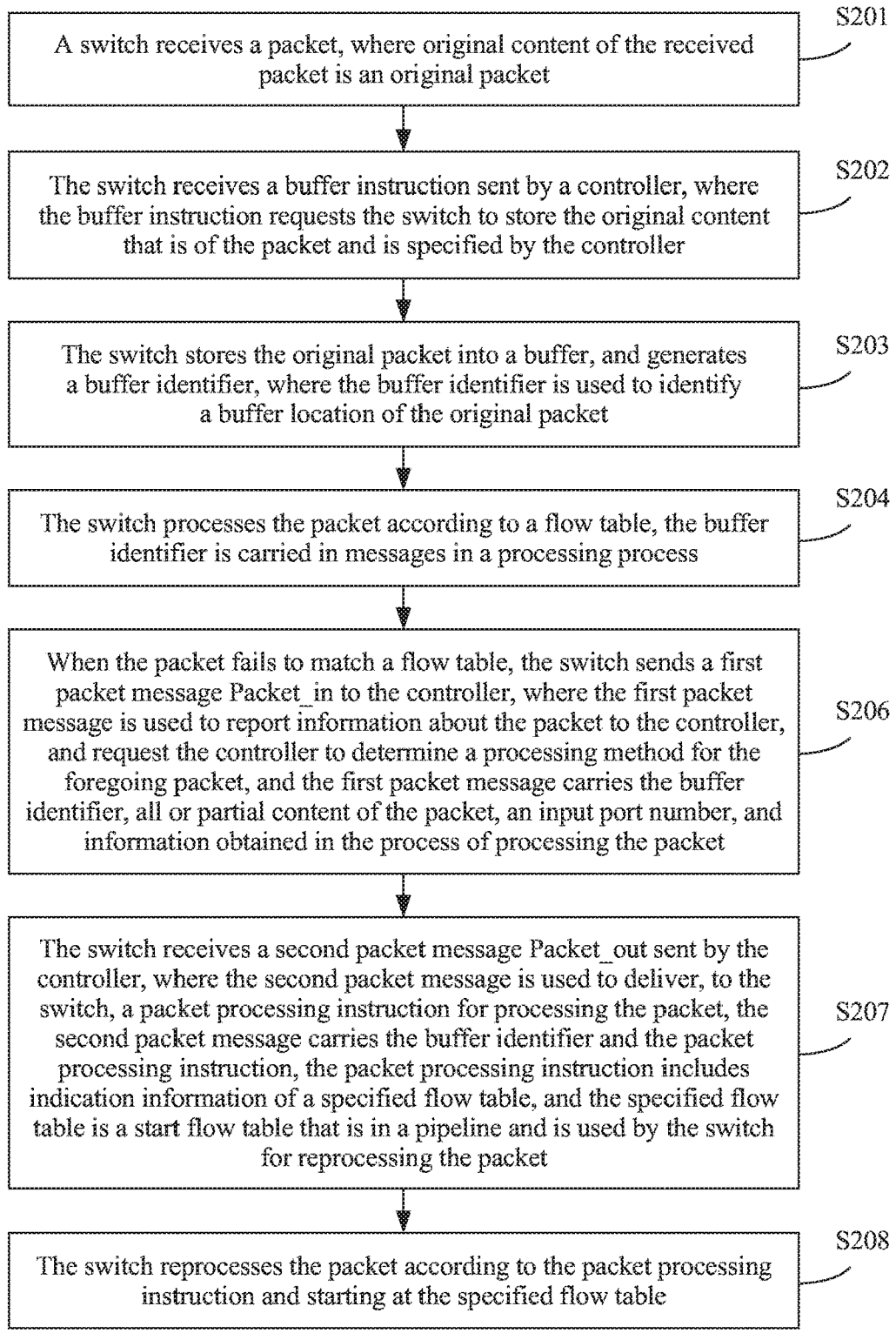
FIG. 2 is a flowchart of another implementation manner of a packet control method according to the present embodiments.
Figure 3:
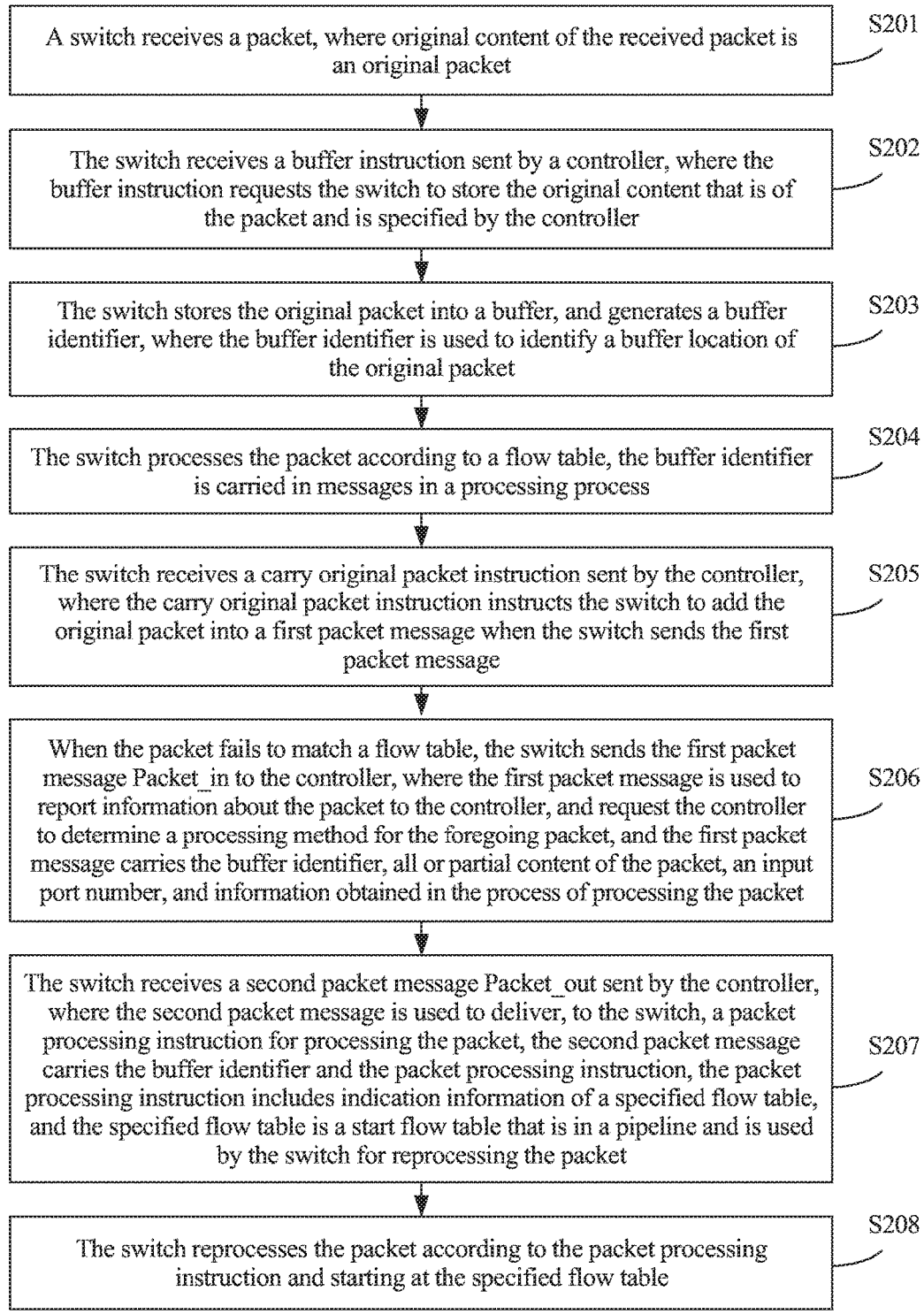
FIG. 3 is a flowchart of still another implementation manner of a packet control method according to the present embodiments.
Figure 4:
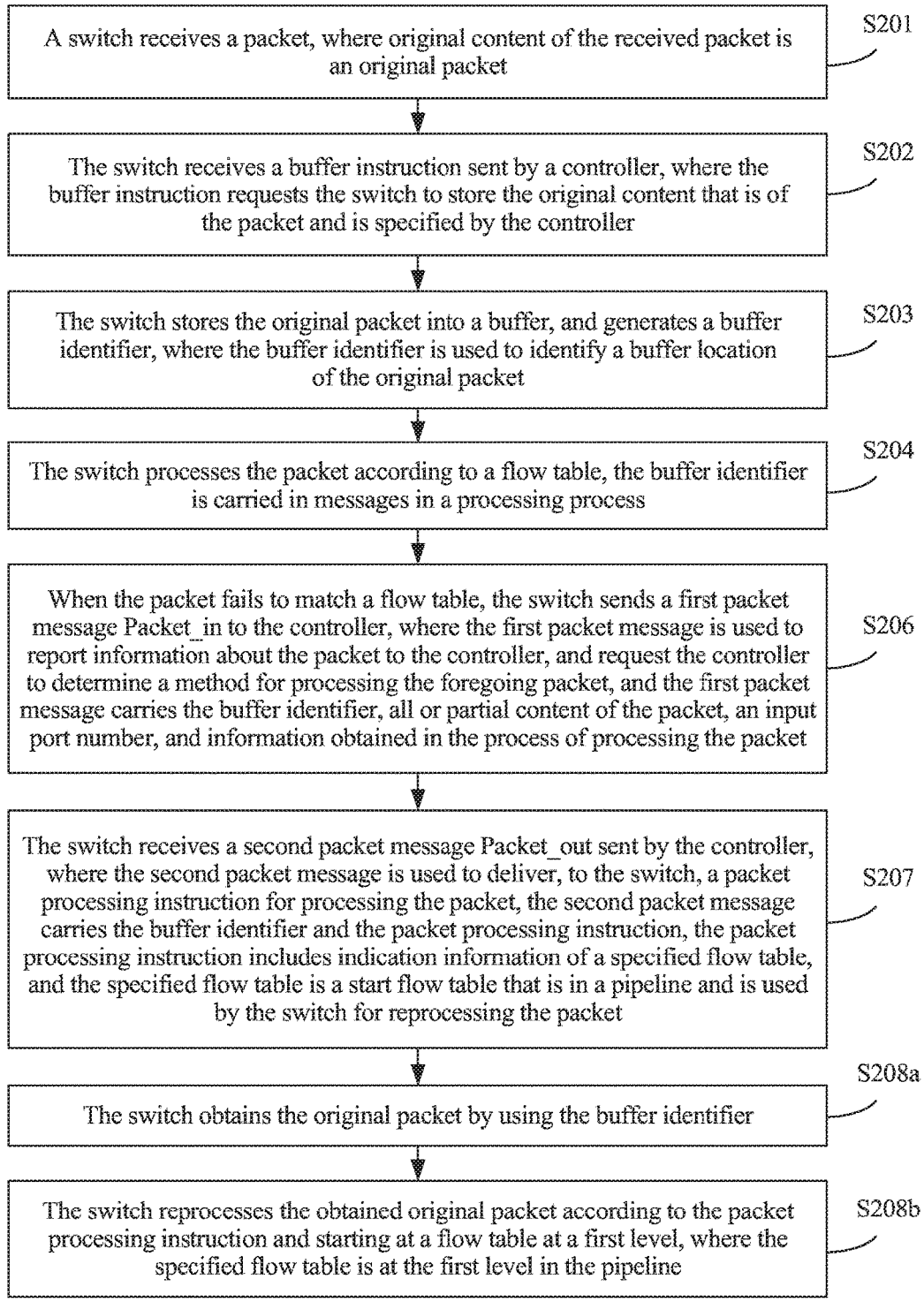
FIG. 4 is a flowchart of still another implementation manner of a packet control method according to the present embodiments.

Referring to FIG. 2 to FIG. 4, FIG. 2 to FIG. 4 are flowcharts of three other implementation manners of a packet control method according to the present embodiments. The three implementation manners are flowcharts of methods at a switch end, and the three implementation manners are basically the same as the implementation manner in FIG. 1. For same parts, refer to FIG. 1 and relevant written description; and for different parts, specific content is as follows.

Step S201: A switch receives a packet, where original content of the received packet is an original packet.

Step S202: The switch receives a buffer instruction sent by a controller, where the buffer instruction requests the switch to store the original content that is of the packet and is specified by the controller.

The original content of the packet is the original packet. That is, the switch may determine, according to the buffer instruction of the controller, whether to buffer the original packet.

It should be noted that, there is no obvious sequence between step S201 and step S202, provided that step S202 is performed before step S203.

Step S203: The switch stores the original packet into a buffer, and generates a buffer identifier, where the buffer identifier is used to identify a buffer location of the original packet.

Step S204: The switch processes the packet according to a flow table, and adds the buffer identifier into metadata in a processing process.

Step S205: The switch receives a carry original packet instruction sent by the controller, where the carry original packet instruction instructs the switch to add the original packet into a first packet message when the switch sends the first packet message.

When sending the first packet message, the switch may determine, according to the carry original packet instruction sent by the controller, whether to add the original packet into the first packet message. When the instruction requests the switch to add the original packet into the first packet message, the switch may add all of the original packet, a part of the original packet, or a transformation of the original packet into the first packet message according to an actual processing situation, and send the first packet message to the controller.

It should be pointed out that, there is no obvious sequence between step S205 and previous steps, provided that step S205 is performed before step S206.

Step S206: When the packet fails to match a flow table, the switch sends the first packet message Packet_in to the controller, where the first packet message is used to report information about the packet to the controller, and request the controller to determine a processing method for the packet, and the first packet message carries the buffer identifier, all or partial content of the packet, an input port number, and information obtained in the process of processing the packet.

When step S205 is performed, step S206 is specifically as follows: The switch sends the first packet message Packet_in to the controller, where the first packet message carries the buffer identifier, and all of the original packet obtained by using the buffer identifier, a part of the original packet, or a transformation of the original packet, and further carries the input port number and the information obtained in the process of processing the packet.

The switch sends the first packet message Packet_in to the controller, and a Buffer_id field of the first packet message stores the buffer identifier. In this way, functions of an existing Buffer_id information element can be expanded.

The switch sends the first packet message Packet_in to the controller, and a Packet_id field of the first packet message stores the buffer identifier. In this way, functions of an existing Packet_id can be expanded.

Step S207: The switch receives a second packet message Packet_out sent by the controller, where the second packet message is used to deliver, to the switch, a packet processing instruction for processing the packet, the second packet message carries the buffer identifier and the packet processing instruction, the packet processing instruction includes indication information of a specified flow table, and the specified flow table is a start flow table that is in a pipeline and is used by the switch for reprocessing the packet.

Step S208: The switch reprocesses the packet according to the packet processing instruction and starting at the specified flow table.

Step S208 may be performed in the following manner, and may be specifically as follows:

Step S208a: The switch obtains the original packet by using the buffer identifier.

Step S208b: The switch reprocesses the obtained original packet according to the packet processing instruction and starting at a flow table at a first level, where the specified flow table is at the first level in the pipeline.

In this manner, the switch obtains the original packet by using the buffer identifier, and reprocesses the original packet starting at a flow table at the first level. This manner is relatively suitable for a situation in which the original packet needs to be reprocessed or a situation in which some switches cannot perform insertion processing on the packet by using an intermediate flow table either.

In this implementation manner of the present embodiments, a switch stores a received original packet into a buffer, and generates a buffer identifier, the buffer identifier is carried in messages in a process of processing the packet according to a flow table, where a sent Packet_in message carries the buffer identifier, all or partial content of the packet, an input port number, and information obtained in the process of processing the packet, and a received Packet_out message carries the buffer identifier and a packet processing instruction; and reprocesses the packet. The switch stores the received original packet into the buffer, and generates the buffer identifier, and both a sent message and a received message carry the buffer identifier. In this way, when requiring the original packet, the switch may obtain the original packet according to the buffer identifier, so that the switch can better process the packet. In addition, a controller sends a buffer instruction, so that the switch can selectively buffer the original packet; and the controller sends a carry original packet instruction, so that all of the original packet, a part of the original packet, or a transformation of the original packet can be sent to the controller, and the controller obtains packet information that is complete enough, and correctly determines processing on the packet. The original packet is obtained by using the buffer identifier, so that the original packet can be reprocessed starting at a flow table at a first level.

Figure 5A:
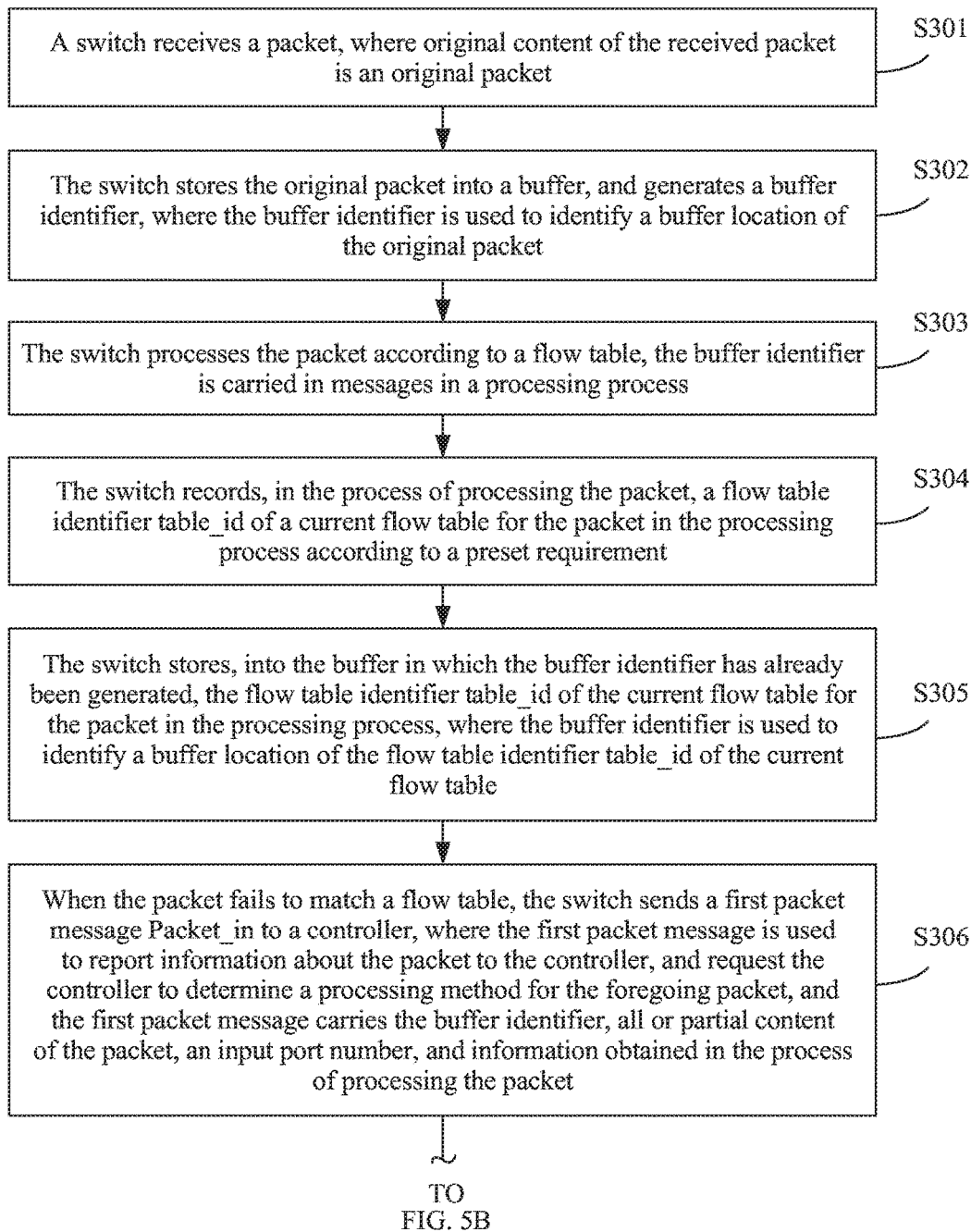
FIG. 5A and FIG. 5B are flowcharts of still another implementation manner of a packet control method according to the present embodiments.
Figure 5B:
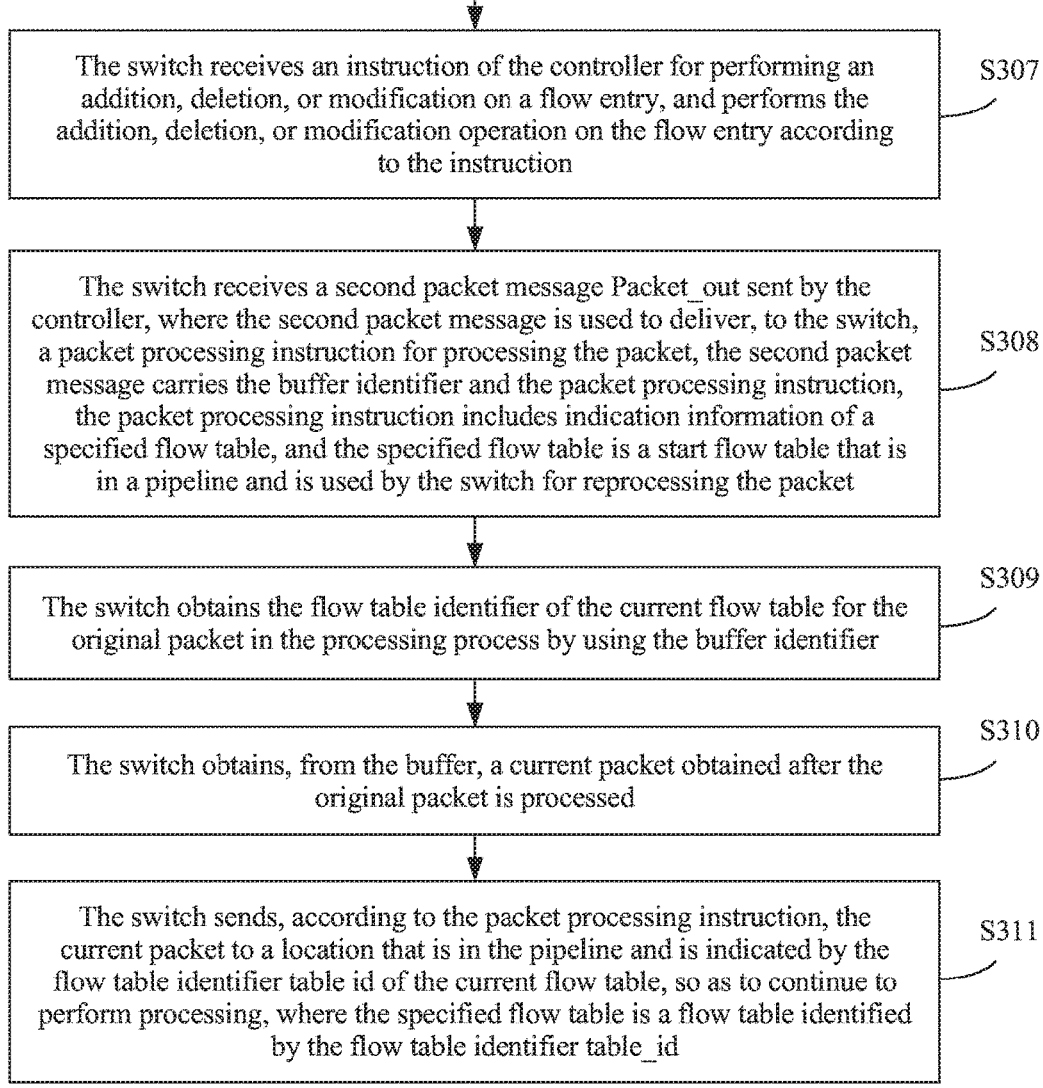

Referring to FIG. 5A and FIG. 5B, FIG. 5A and FIG. 5B are flowcharts of still another implementation manner of a packet control method according to the present embodiments. This implementation manner is a flowchart of a method at a switch end, and this implementation manner is basically the same as the implementation manner in FIG. 1. For same parts, refer to FIG. 1 and relevant written description; and for different parts, specific content is as follows.

Step S301: A switch receives a packet, where original content of the received packet is an original packet.

Step S302: The switch stores the original packet into a buffer, and generates a buffer identifier, where the buffer identifier is used to identify a buffer location of the original packet.

Step S303: The switch processes the packet according to a flow table, and adds the buffer identifier into metadata in a processing process.

Step S304: The switch records, in the process of processing the packet, a flow table identifier table_id of a current flow table for the packet in the processing process according to a preset requirement.

Step S305: The switch stores, into the buffer in which the buffer identifier has already been generated, the flow table identifier table_id of the current flow table for the packet in the processing process.

In the process of processing the packet, the switch records the flow table identifier table_id of the current flow table, and stores the flow table identifier table_id into the buffer in which the buffer identifier has already been generated, so as to obtain the flow table identifier table_id according to the buffer identifier. Therefore, during subsequent reprocessing, the switch may send a current packet to a location that is in a pipeline and is indicated by the flow table identifier table_id of the current flow table, so as to continue to perform processing.

Step S306: When the packet fails to match a flow table, the switch sends a first packet message Packet_in to a controller, where the first packet message is used to report information about the packet to the controller, and request the controller to determine a processing method for the packet, and the first packet message carries the buffer identifier, all or partial content of the packet, an input port number, and information obtained in the process of processing the packet.

The switch sends the first packet message Packet_in to the controller, and a Buffer_id field of the first packet message stores the buffer identifier. In this way, functions of an existing Buffer_id information element can be expanded.

The switch sends the first packet message Packet_in to the controller, and a Packet_id field of the first packet message stores the buffer identifier. In this way, functions of an existing Packet_id can be expanded.

Step S307: The switch receives an instruction of the controller for performing an addition, deletion, or modification operation on a flow entry, and performs the addition, deletion, or modification operation on the flow entry according to the instruction.

Step S308: The switch receives a second packet message Packet_out sent by the controller, where the second packet message is used to deliver, to the switch, a packet processing instruction for processing the packet, the second packet message carries the buffer identifier and the packet processing instruction, the packet processing instruction includes indication information of a specified flow table, and the specified flow table is a start flow table that is in a pipeline and is used by the switch for reprocessing the packet.

Step S309: The switch obtains the flow table identifier table_id of the current flow table for the original packet in the processing process by using the buffer identifier.

Step S310: The switch obtains, from the buffer, a current packet obtained after the original packet is processed.

Step S311: The switch sends, according to the packet processing instruction, the current packet to a location that is in the pipeline and is indicated by the flow table identifier table id of the current flow table, so as to continue to perform processing, where the specified flow table is a flow table identified by the flow table identifier table_id.

The switch obtains the flow table identifier table_id of the current flow table for the original packet in the processing process by using the buffer identifier; obtains, from the buffer, the current packet obtained after the original packet is processed; and then, sends the current packet to the location that is in the pipeline and is indicated by the flow table identifier table id of the current flow table, so as to continue to perform processing. In this manner, the packet may be avoided being reprocessed starting at a flow table at a first level, and time is saved. This manner is suitable for a situation in which some switches can perform insertion processing on the packet by using an intermediate flow table.

In this implementation manner of the present embodiments, a switch stores a received original packet into a buffer, and generates a buffer identifier, the buffer identifier is carried in messages in a process of processing the packet according to a flow table, where a sent Packet_in message carries the buffer identifier, all or partial content of the packet, an input port number, and information obtained in the process of processing the packet, and a received Packet_out message carries the buffer identifier and a packet processing instruction; and reprocesses the packet. The switch stores the received original packet into the buffer, and generates the buffer identifier, and both a sent message and a received message carry the buffer identifier. In this way, when requiring the original packet, the switch may obtain the original packet according to the buffer identifier, so that the switch can better and flexibly process the packet. In addition, the switch records a flow table identifier table_id of a current flow table, and stores the flow table identifier table id into the buffer in which the buffer identifier has already been generated, so that the packet can be avoided being reprocessed starting at a flow table at a first level, and time is saved.

It should be noted that, in an actual application, steps in the foregoing implementation manner may be increased, decreased, or combined according to a specific situation. Details are not described herein.

Figure 6:
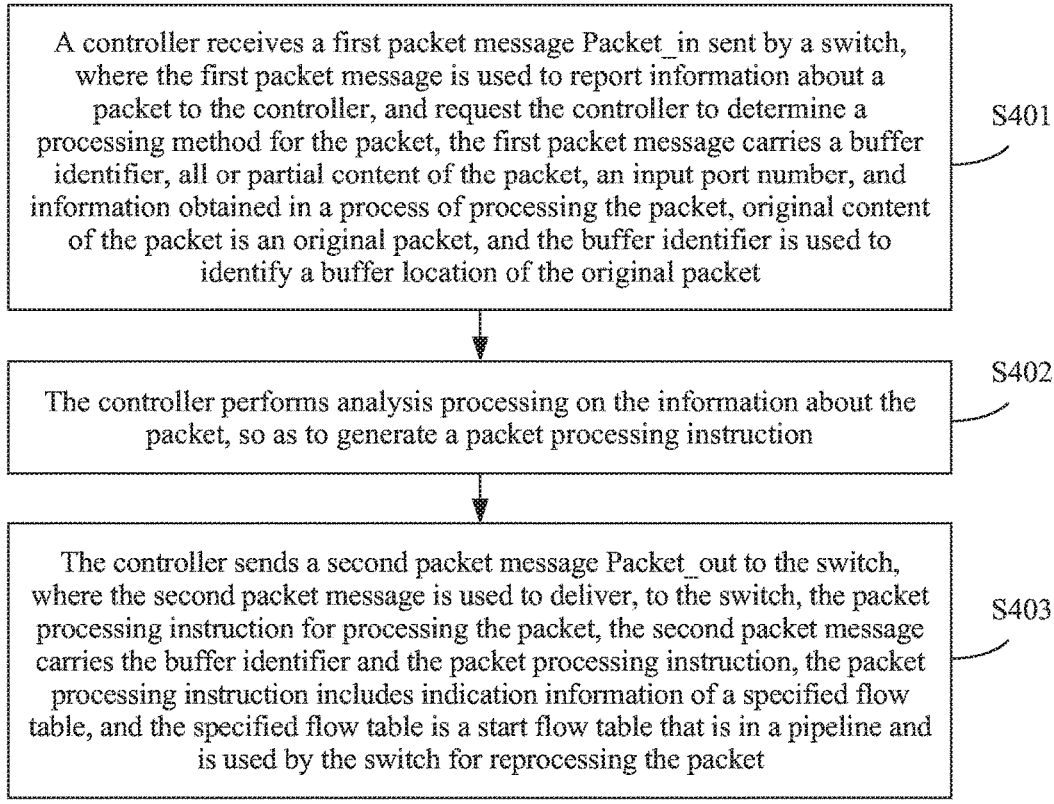
FIG. 6 is a flowchart of still another implementation manner of a packet control method according to the present embodiments.

Referring to FIG. 6, FIG. 6 is a flowchart of still another implementation manner of a packet control method according to the present embodiments. This implementation manner is a flowchart of a method at a controller end, and includes the following steps.

Step S401: A controller receives a first packet message Packet_in sent by a switch, where the first packet message is used to report information about a packet to the controller, and request the controller to determine a processing method for the packet, the first packet message carries a buffer identifier, all or partial content of the packet, an input port number, and information obtained in a process of processing the packet, original content of the packet is an original packet, and the buffer identifier is used to identify a buffer location of the original packet.

The controller is used to centrally control a network and implement functions of a control layer. The controller controls a flow table in the switch by using a standard interface in an OpenFlow protocol, so as to centrally control the entire network, for example, to find a network status and event (a topology, a device, or traffic), control communication of the switch, and share resources such as storage, thread, and a test.

The first packet message Packet_in refers to a message for reporting, by the switch, the information about the packet to the controller, and the information may be a packet processing success, a packet processing failure, a current processing state, or the like. In a scenario in which the packet fails to match a flow entry, the switch may report the event to the controller by using the first packet message Packet_in, and request the controller to determine the processing method for the packet. Alternatively, when the switch needs to send a message to the controller, the switch may report the event to the controller by using the first packet message Packet_in.

The first packet message carries the buffer identifier, and this helps the controller to add the buffer identifier into a second packet message when the controller sends the second packet message to the switch. The buffer identifier is used to identify the buffer location of the original packet.

The first packet message further includes all or partial content of the packet, the input port number, and the information obtained in the process of processing the packet. All or partial content of the packet may be all content or partial content of the original packet, a modified packet, a modification record of the packet, and the like. The input port number is used to identify the switch. The information obtained during packet processing may be used to provide additional information to which the controller can make reference, and helps the controller to perform analysis processing on the packet.

Step S402: The controller performs analysis processing on the information about the packet, so as to generate a packet processing instruction.

The packet processing instruction is an instruction that is about how to process the packet and is generated after the controller performs analysis processing on the information about the packet.

Step S403: The controller sends a second packet message Packet_out to the switch, where the second packet message is used to deliver, to the switch, the packet processing instruction for processing the packet, the second packet message carries the buffer identifier and the packet processing instruction, the packet processing instruction includes indication information of a specified flow table, and the specified flow table is a start flow table that is in a pipeline and is used by the switch for reprocessing the packet.

The second packet message Packet_out is used by the controller for sending, to the switch, the packet processing instruction for processing the packet, and is a message in response to the first packet message Packet_in. The packet processing instruction includes the indication information of the specified flow table, and the specified flow table is the start flow table that is in the pipeline and is used by the switch for reprocessing the packet. For example, when the packet needs to be reprocessed, the specified flow table may be a flow table at a first level; when the packet needs to be processed starting at the flow table that the packet fails to match, the specified flow table may be the flow table that the packet fails to match. The packet processing instruction is carried in the second packet message. The first packet message Packet_in carries the buffer identifier, and the second packet message Packet_out is a message in response to the first packet message Packet_in, and also carries the buffer identifier, so that when requiring the original packet after receiving the second packet message Packet_out, the switch can obtain the original packet by using the buffer identifier.

In this implementation manner of the present embodiments, a controller receives a first packet message Packet_in sent by a switch, where the Packet_in message carries a buffer identifier, all or partial content of a packet, an input port number, and information obtained in a process of processing the packet; performs analysis processing on information about the packet, so as to generate a packet processing instruction; and sends a second packet message Packet_out to the switch, where the second packet message carries the buffer identifier and the packet processing instruction. Both a received message and a sent message carry the buffer identifier. In this way, when requiring the original packet, the switch may obtain the original packet according to the buffer identifier, so that the switch can flexibly process the packet according to an instruction of the controller.

Figure 7:
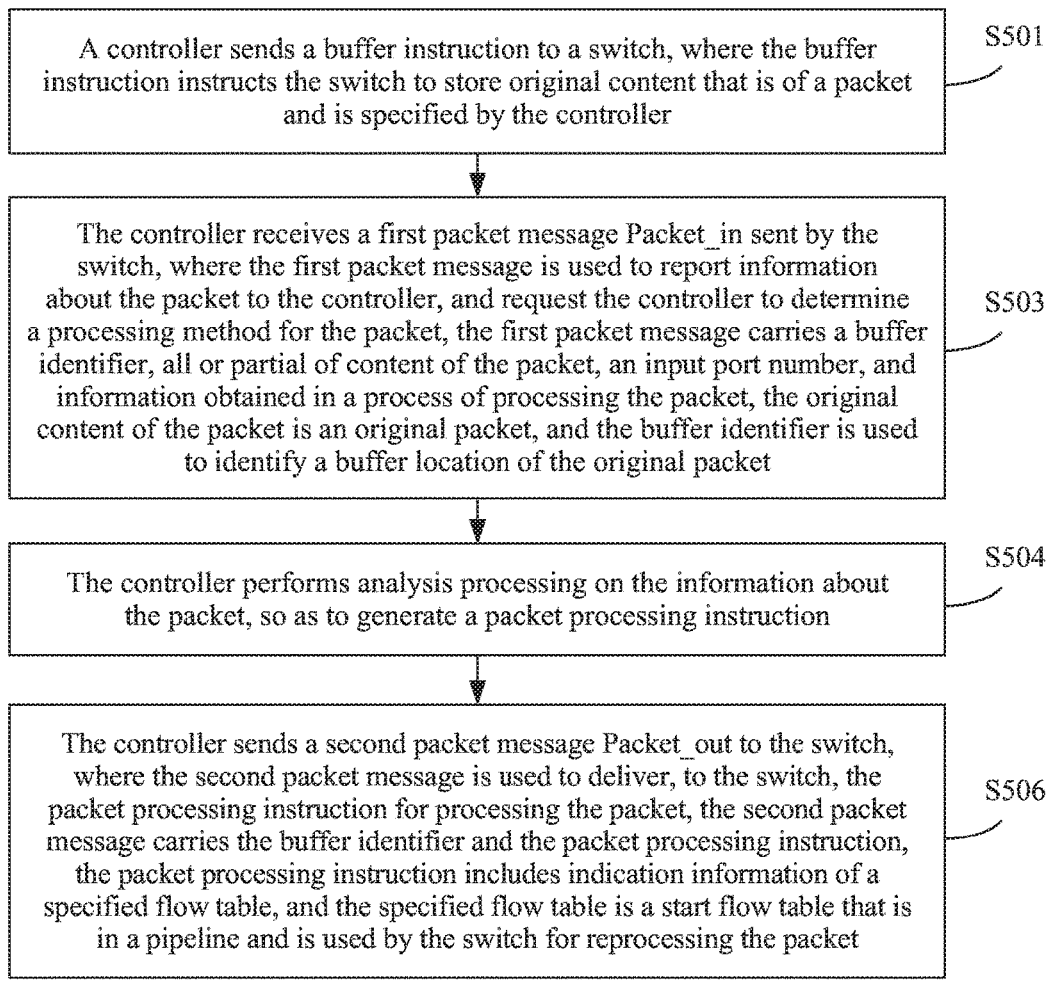
FIG. 7 is a flowchart of still another implementation manner of a packet control method according to the present embodiments.
Figure 8:
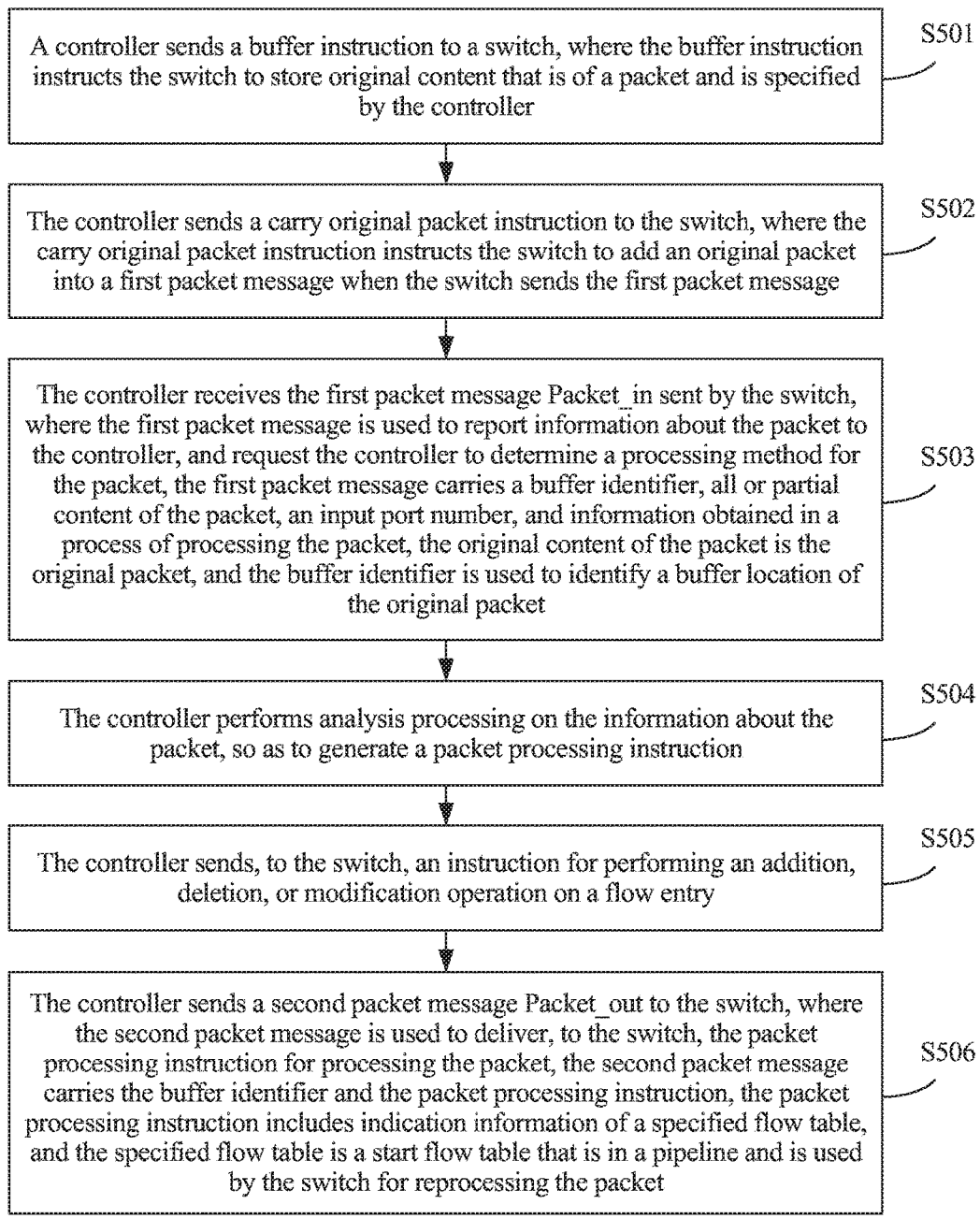
FIG. 8 is a flowchart of still another implementation manner of a packet control method according to the present embodiments.

Referring to FIG. 7 and FIG. 8, FIG. 7 and FIG. 8 are flowcharts of two implementation manners of a packet control method according to the present embodiments. The implementation manners are flowcharts of methods at a controller end, and the implementation manners are basically the same as the implementation manner in FIG. 6. For same parts, refer to FIG. 6 and relevant written description; and for different parts, specific content is as follows.

Step S501: A controller sends a buffer instruction to a switch, where the buffer instruction instructs the switch to store original content that is of a packet and is specified by the controller.

The original content of the packet is an original packet. That is, the switch may determine, according to the buffer instruction of the controller, whether to buffer the original packet.

Step S502: The controller sends a carry original packet instruction to the switch, where the carry original packet instruction instructs the switch to add an original packet into a first packet message when the switch sends the first packet message.

Before the controller receives the first packet message, if the controller requires the original packet, the carry original packet instruction sent by the controller instructs the switch to add the original packet into the first packet message when the switch sends the first packet message.

Step S503: The controller receives the first packet message Packet_in sent by the switch, where the first packet message is used to report information about the packet to the controller, and request the controller to determine a processing method for the packet, the first packet message carries a buffer identifier, all or partial content of the packet, an input port number, and information obtained in a process of processing the packet, the original content of the packet is the original packet, and the buffer identifier is used to identify a buffer location of the original packet.

When step S502 is performed, step S503 is specifically as follows: The controller receives the first packet message Packet_in sent by the switch, where the first packet message carries the buffer identifier, and all of the original packet obtained by using the buffer identifier, a part of the original packet, or a transformation of the original packet, and the buffer identifier is used to identify the buffer location of the original packet.

Step S504: The controller performs analysis processing on the information about the packet, so as to generate a packet processing instruction.

When step S502 is performed, step S504 is specifically as follows: The controller performs analysis processing on all of the original packet, a part of the original packet, or a transformation of the original packet, so as to generate the packet processing instruction.

Step S505: The controller sends, to the switch, an instruction for performing an addition, deletion, or modification operation on a flow entry.

Step S506: The controller sends a second packet message Packet_out to the switch, where the second packet message is used to deliver, to the switch, the packet processing instruction for processing the packet, the second packet message carries the buffer identifier and the packet processing instruction, the packet processing instruction includes indication information of a specified flow table, and the specified flow table is a start flow table that is in a pipeline and is used by the switch for reprocessing the packet.

When step S502 is performed, step S506 is specifically as follows: The controller sends the second packet message Packet_out to the switch, where the second packet message carries the buffer identifier and the packet processing instruction that is generated after the controller performs analysis processing on all of the original packet, a part of the original packet, or a transformation of the original packet.

In this implementation manner of the present embodiments, a controller receives a first packet message Packet_in sent by a switch, where the Packet_in message carries a buffer identifier, all or partial content of a packet, an input port number, and information obtained in a process of processing the packet; performs analysis processing on information about the packet, so as to generate a packet processing instruction; and sends a second packet message Packet_out to the switch, where the second packet message carries the buffer identifier and the packet processing instruction. Both a received message and a sent message carry the buffer identifier. In this way, when requiring the original packet, the switch may obtain the original packet according to the buffer identifier, so that the switch can flexibly process the packet according to an instruction of the controller. In addition, the controller sends a buffer instruction, so that the switch can selectively buffer the original packet; and the controller sends a carry original packet instruction, so that all of the original packet, a part of the original packet, or a transformation of the original packet can be sent to the controller, and the controller obtains packet information that is complete enough, and correctly determines processing on the packet.

Figure 9:
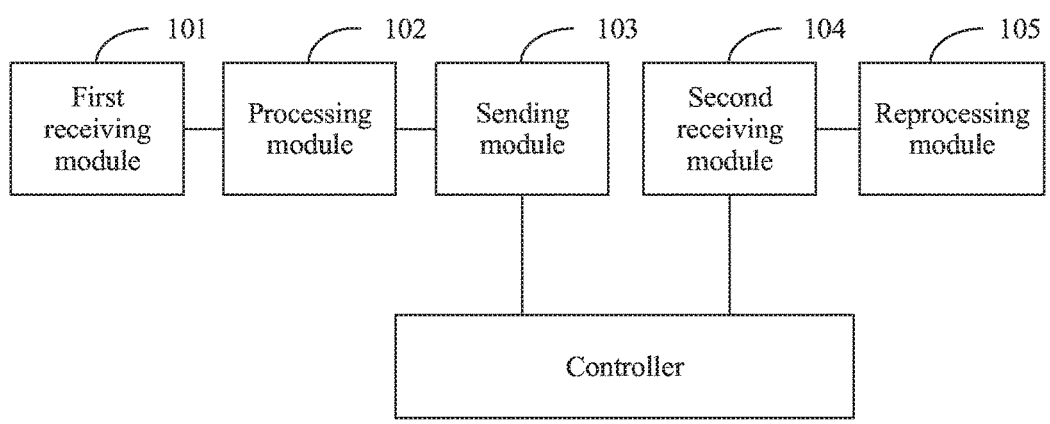
FIG. 9 is a schematic structural diagram of an implementation manner of a switch according to the present embodiments.

Referring to FIG. 9, FIG. 9 is a schematic structural diagram of an implementation manner of a switch according to the present embodiments. The switch includes: a first receiving module 101, a processing module 102, a sending module 103, a second receiving module 104, and a reprocessing module 105.

It should be noted that, the switch in this implementation manner may perform steps in the method procedures in FIG. 1 to FIG. 5A and FIG. 5B.

The first receiving module 101 is configured to receive a packet, where original content of the packet is an original packet, the original packet is stored in a buffer, and a buffer location of the original packet is identified by using a buffer identifier.

The original packet is not processed by the switch, and the original packet includes all information that is the most original and the most comprehensive. Information in the packet processed by the switch is partially changed by the switch, and is less comprehensive than information included in the original packet. The original packet is stored in the buffer, and the buffer identifier is used to identify the buffer location of the original packet, so that when the original packet is required, the original packet can be obtained from the buffer by using the buffer identifier.

The processing module 102 is configured to process the packet according to a pipeline.

The pipeline includes flow tables, a flow table includes many flow entries, and each flow entry is a forwarding rule. A destination port for forwarding a packet that enters the switch is obtained by querying a flow table. A flow entry includes header fields, counters, and actions. The header fields include an identifier of the flow entry. The counters are used to count statistical data of the flow entry. The actions indicate an operation that should be performed on a packet that matches the flow entry. The header fields are also referred to as match fields and are used to match packet header content of the packet received by the switch. The matching specifically means matching information such as a packet header field and a receive port number with a specified value.

The switch processes the packet according to the flow table, for example, the switch performs matching starting at the first flow table; and if a flow entry is found by means of matching, the switch performs an instruction in the flow entry, and then, jumps to a next flow table to continue to perform a matching operation. If there is no flow entry that is in the flow table and matches the packet, the packet is discarded or forwarded to a controller for processing. If an instruction in a matching flow entry no longer instructs to jump to a next flow table, matching ends, and actions corresponding to the matching are performed, for example, to forward the packet to a specified output port, discard the packet, modify a packet header, and forward the packet to a group table.

The sending module 104 is configured to: when the packet fails to match a flow table, send a first packet message Packet_in to a controller, where the first packet message is used to report information about the packet to the controller, and request the controller to determine a processing method for the packet, and the first packet message carries the buffer identifier, all or partial content of the packet, an input port number, and information obtained in a process of processing the packet.

The first packet message Packet_in refers to a message for reporting, by the switch, the information about the packet to the controller, and the information may be a packet processing success, a packet processing failure, a current processing state, or the like. In a scenario in which the packet fails to match a flow entry, the switch may report the event to the controller by using the first packet message Packet_in, and request the controller to determine the processing method for the packet. Alternatively, when the switch needs to send a message to the controller, the switch may report the event to the controller by using the first packet message Packet_in.

The first packet message carries the buffer identifier, and this helps the controller to add the buffer identifier into a second packet message when the controller sends the second packet message to the switch.

The first packet message further includes all or partial content of the packet, the input port number, and the information obtained in the process of processing the packet. All or partial content of the packet may be all content or partial content of the original packet, a modified packet, a modification record of the packet, and the like. The input port number is used to identify the switch. The information obtained during packet processing may be used to provide additional information to which the controller can make reference, and helps the controller to perform analysis processing on the packet.

The switch sends the first packet message Packet_in to the controller, and a Packet_id field of the first packet message stores the buffer identifier. In this way, functions of an existing Packet_id can be expanded.

The first packet message Packet_in is sent to the controller, and a Buffer_id field of the first packet message stores the buffer identifier. In this way, functions of an existing Buffer_id information element can be expanded.

The second receiving module 104 is configured to receive a second packet message Packet_out sent by the controller, where the second packet message is used to deliver, to the switch, a packet processing instruction for processing the packet, the second packet message carries the buffer identifier and the packet processing instruction, the packet processing instruction includes indication information of a specified flow table, and the specified flow table is a start flow table that is in the pipeline and is used by the switch for reprocessing the packet.

The second packet message Packet_out is used by the controller for sending, to the switch, the packet processing instruction for processing the packet, and is a message in response to the first packet message Packet_in. The packet processing instruction includes the indication information of the specified flow table, and the specified flow table is the start flow table that is in the pipeline and is used by the switch for reprocessing the packet. For example, when the packet needs to be reprocessed, the specified flow table may be a flow table at a first level; when the packet needs to be processed starting at the flow table that the packet fails to match, the specified flow table may be the flow table that the packet fails to match. The packet processing instruction is carried in the second packet message. The first packet message Packet_in carries the buffer identifier, and the second packet message Packet_out is a message in response to the first packet message Packet_in, and also carries the buffer identifier, so that when requiring the original packet after receiving the second packet message Packet_out, the switch can obtain the original packet by using the buffer identifier.

The reprocessing module 105 is configured to reprocess the packet according to the packet processing instruction and starting at the specified flow table.

When the second packet message Packet_out is received, the packet may be reprocessed starting at the specified flow table and according to the packet processing instruction carried in the second packet message Packet_out. The reprocessing may mean reprocessing the original packet, or may mean continuing to process a current packet starting at the flow table that the packet fails to match.

In this implementation manner of the present embodiments, a switch receives a packet, and processes the packet according to a pipeline, where an original packet is stored in a buffer, and a buffer location of the original packet is identified by using a buffer identifier; when the packet fails to match a flow table, the switch sends a first packet message Packet_in to a controller, where the first packet message carries the buffer identifier, all or partial content of the packet, an input port number, and information obtained in a process of processing the packet; the switch receives a second packet message Packet_out sent by the controller, where the second packet message carries the buffer identifier and a packet processing instruction, and the packet processing instruction includes indication information of a specified flow table; and the switch reprocesses the packet according to the packet processing instruction and starting at the specified flow table. In this way, when requiring the original packet, the switch may obtain the original packet according to the buffer identifier, so that the switch can flexibly process the packet according to an instruction of the controller.

Figure 10:
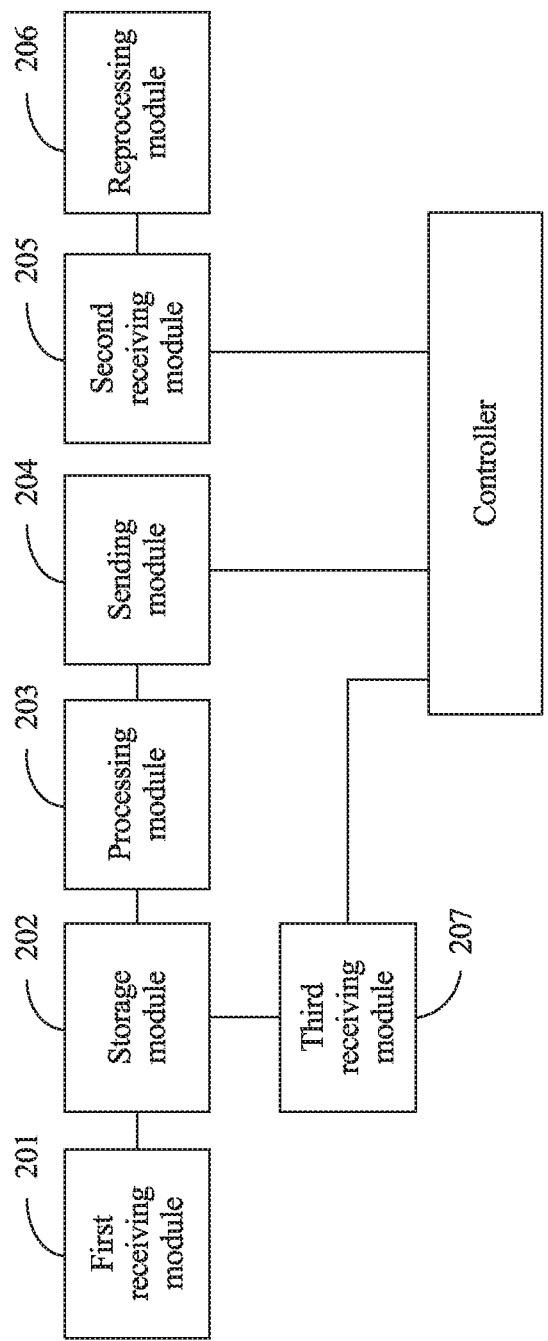
FIG. 10 is a schematic structural diagram of another implementation manner of a switch according to the present embodiments.
Figure 11:
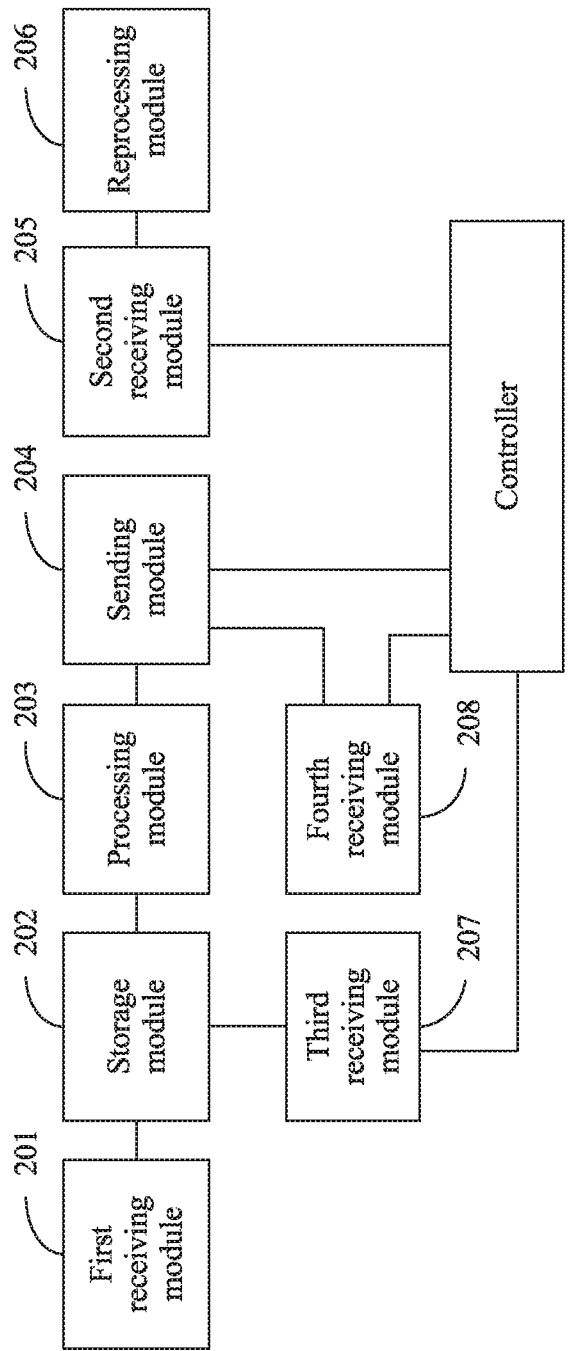
FIG. 11 is a schematic structural diagram of still another implementation manner of a switch according to the present embodiments.
Figure 12:
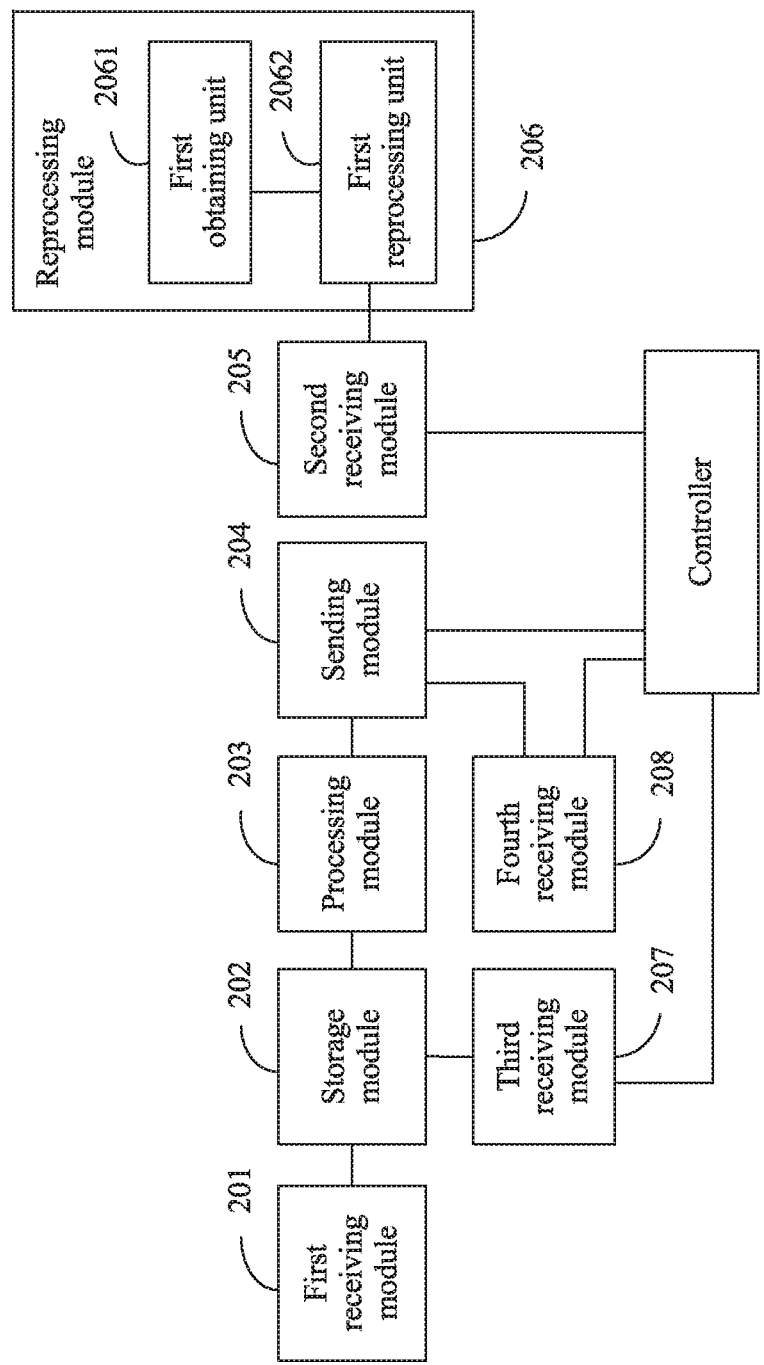
FIG. 12 is a schematic structural diagram of still another implementation manner of a switch according to the present embodiments.

Referring to FIG. 10 to FIG. 12, FIG. 10 to FIG. 12 are schematic structural diagrams of three other implementation manners of a switch according to the present embodiments. The switch in this implementation manner is basically the same as the switch in FIG. 9. For same parts, refer to FIG. 9 and relevant written description; and for different parts, refer to the following specific content.

The switch includes: a first receiving module 201, a storage module 202, a processing module 203, a sending module 204, a second receiving module 205, a reprocessing module 206, a third receiving module 207, and a fourth receiving module 208.

It should be noted that, the switch in this implementation manner may perform steps in the method procedures in FIG. 2 to FIG. 4.

The first receiving module 201 is configured to receive a packet, where original content of the received packet is an original packet.

The third receiving module 207 is configured to receive a buffer instruction sent by a controller, where the buffer instruction requests the switch to store the original content that is of the packet and is specified by the controller.

The original content of the packet is the original packet. That is, the switch may determine, according to the buffer instruction of the controller, whether to buffer the original packet.

The storage module 202 is configured to: store the original packet into a buffer, and generate a buffer identifier, where the buffer identifier is used to identify a buffer location of the original packet.

The processing module 203 is configured to: process the packet according to a flow table, and add the buffer identifier into metadata in a processing process.

The fourth receiving module 208 is configured to receive a carry original packet instruction sent by the controller, where the carry original packet instruction instructs the switch to add the original packet into a first packet message when the switch sends the first packet message.

When sending the first packet message, the switch may determine, according to the carry original packet instruction sent by the controller, whether to add the original packet into the first packet message. When the instruction requests the switch to add the original packet into the first packet message, the switch may add all of the original packet, a part of the original packet, or a transformation of the original packet into the first packet message according to an actual processing situation, and send the first packet message to the controller.

The sending module 204 is configured to: when the packet fails to match a flow table, send the first packet message Packet_in to the controller, where the first packet message is used to report information about the packet to the controller, and request the controller to determine a processing method for the packet, and the first packet message carries the buffer identifier, all or partial content of the packet, an input port number, and information obtained in the process of processing the packet.

When the switch includes the fourth receiving module 208, the sending module 204 is specifically configured to send the first packet message Packet_in to the controller, where the first packet message carries the buffer identifier, and all of the original packet obtained by using the buffer identifier, a part of the original packet, or a transformation of the original packet, and the second packet message carries the buffer identifier and a packet processing instruction that is generated after the controller performs analysis processing on the packet according to all of the original packet, a part of the original packet, or a transformation of the original packet.

The sending module 204 is further specifically configured to send the first packet message Packet_in to the controller, and a Packet_id field of the first packet message stores the buffer identifier. In this way, functions of an existing Packet_id can be expanded.

The sending module 204 is further specifically configured to send the first packet message Packet_in to the controller, and a Buffer_id field of the first packet message stores the buffer identifier. In this way, functions of an existing Buffer_id information element can be expanded.

The second receiving module 205 is configured to receive a second packet message Packet_out sent by the controller, where the second packet message is used to deliver, to the switch, a packet processing instruction for processing the packet, the second packet message carries the buffer identifier and the packet processing instruction, the packet processing instruction includes indication information of a specified flow table, and the specified flow table is a start flow table that is in a pipeline and is used by the switch for reprocessing the packet.

In this case, the second packet message carries the buffer identifier and the packet processing instruction that is generated after the controller performs analysis processing on the packet according to all of the original packet, a part of the original packet, or a transformation of the original packet.

The reprocessing module 206 is configured to reprocess the packet according to the packet processing instruction and starting at the specified flow table.

The reprocessing module 206 includes a first obtaining unit 2061 and a first reprocessing unit 2062.

The first obtaining unit 2061 is configured to obtain the original packet by using the buffer identifier.

The first reprocessing unit 2062 is configured to reprocess, according to the packet processing instruction and starting at a flow table at a first level, the original packet obtained by the first obtaining unit, where the specified flow table is at the first level in the pipeline.

In this manner, the original packet is obtained by using the buffer identifier, and the original packet is reprocessed starting at a flow table at the first level. This manner is relatively suitable for a situation in which the original packet needs to be reprocessed or a situation in which some switches cannot perform insertion processing on the packet by using an intermediate flow table either.

In this implementation manner of the present embodiments, a received original packet is stored in a buffer, and a buffer identifier is generated, the buffer identifier is carried in messages in a process of processing the packet according to a flow table, where a sent Packet_in message carries the buffer identifier, all or partial content of the packet, an input port number, and information obtained in the process of processing the packet, and a received Packet_out message carries the buffer identifier and a packet processing instruction; and the packet is reprocessed. A switch stores the received original packet into the buffer, and generates the buffer identifier, and both a sent message and a received message carry the buffer identifier. In this way, when requiring the original packet, the switch may obtain the original packet according to the buffer identifier, so that the switch can better process the packet. In addition, a controller sends a buffer instruction, so that the switch can selectively buffer the original packet; and the controller sends a carry original packet instruction, so that all of the original packet, a part of the original packet, or a transformation of the original packet can be sent to the controller, and the controller obtains packet information that is complete enough, and correctly determines processing on the packet. The original packet is obtained by using the buffer identifier, so that the original packet can be reprocessed starting at a flow table at a first level.

Figure 13:
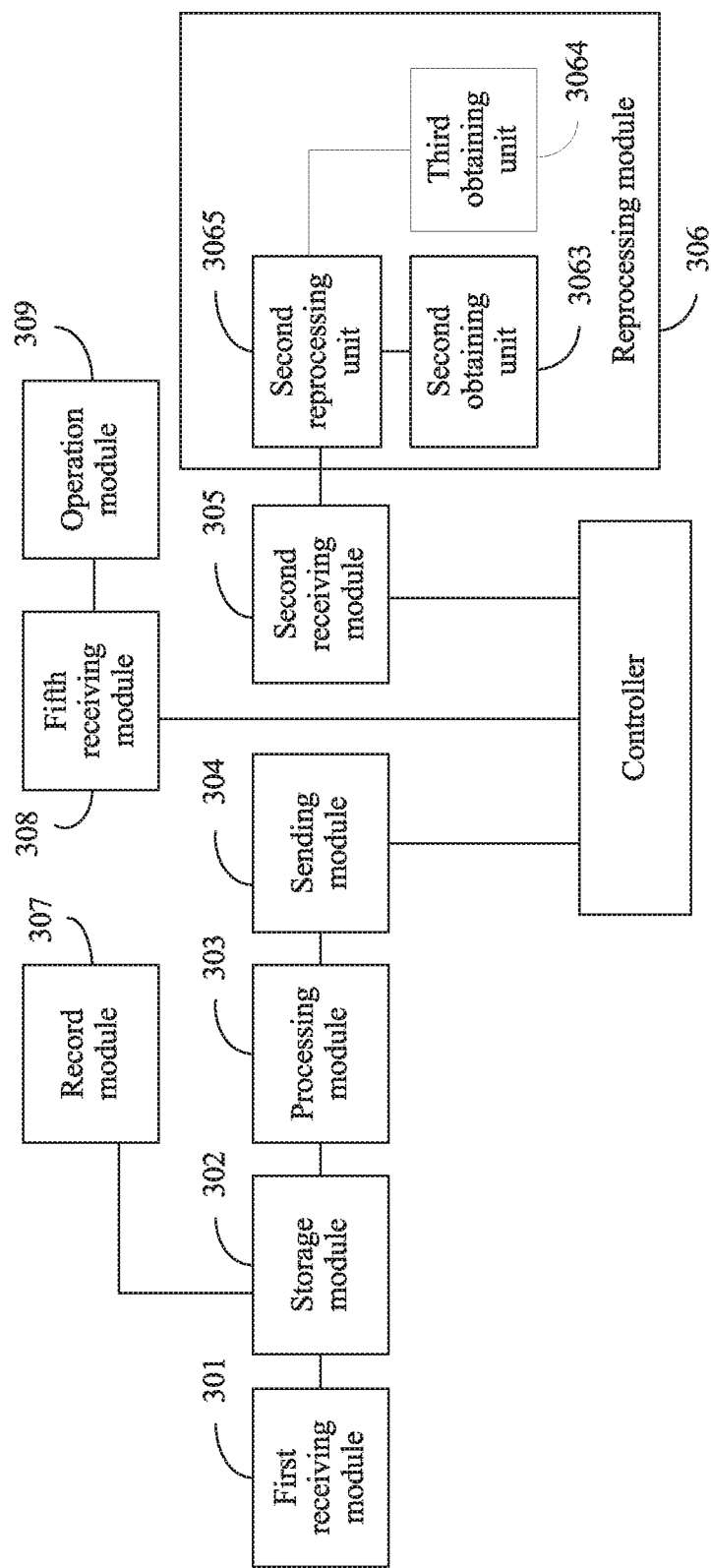
FIG. 13 is a schematic structural diagram of still another implementation manner of a switch according to the present embodiments.

Referring to FIG. 13, FIG. 13 is a schematic structural diagram of still another implementation manner of a switch according to the present embodiments. The switch in this implementation manner is basically the same as the switch in FIG. 9. For same parts, refer to FIG. 9 and relevant written description; and for different parts, refer to the following specific content.

The switch includes: a first receiving module 301, a storage module 302, a processing module 303, a sending module 304, a second receiving module 305, a reprocessing module 306, a record module 307, a fifth receiving module 308, and an operation module 309.

It should be noted that, the switch in this implementation manner may perform steps in the method procedure in FIG. 5A and FIG. 5B.

The first receiving module 301 is configured to receive a packet, where original content of the received packet is an original packet.

The storage module 302 is configured to: store the original packet into a buffer, and generate a buffer identifier, where the buffer identifier is used to identify a buffer location of the original packet.

The processing module 303 is configured to: process the packet according to a flow table, and add the buffer identifier into metadata in a processing process.

The record module 307 is configured to record, in the process of processing the packet, a flow table identifier table_id of a current flow table for the packet in the processing process according to a preset requirement.

The storage module 302 is further configured to store, into the buffer in which the buffer identifier has already been generated, the flow table identifier table_id that is of the current flow table for the packet in the processing process and is recorded by the record module 307.

In the process of processing the packet, the flow table identifier table_id of the current flow table is recorded, and the flow table identifier table_id is stored in the buffer in which the buffer identifier has already been generated, so as to obtain the flow table identifier table_id according to the buffer identifier. Therefore, during subsequent reprocessing, the switch may send a current packet to a location that is in a pipeline and is indicated by the flow table identifier table_id of the current flow table, so as to continue to perform processing.

The sending module 304 is configured to: when the packet fails to match a flow table, send a first packet message Packet_in to a controller, where the first packet message is used to report information about the packet to the controller, and request the controller to determine a processing method for the packet, and the first packet message carries the buffer identifier, all or partial content of the packet, an input port number, and information obtained in the process of processing the packet.

The sending module 304 is specifically configured to send the first packet message Packet_in to the controller, and a Buffer_id field of the first packet message stores the buffer identifier. In this way, functions of an existing Buffer_id information element can be expanded.

The sending module 304 is specifically configured to send the first packet message Packet_in to the controller, and a Packet_id field of the first packet message stores the buffer identifier. In this way, functions of an existing Packet_id can be expanded.

The fifth receiving module 308 is configured to receive an instruction of the controller for performing an addition, deletion, or modification operation on a flow entry.

The operation module 309 is configured to perform the addition, deletion, or modification operation on the flow entry according to the instruction.

The second receiving module 305 is configured to receive a second packet message Packet_out sent by the controller, where the second packet message is used to deliver, to the switch, a packet processing instruction for processing the packet, the second packet message carries the buffer identifier and the packet processing instruction, the packet processing instruction includes indication information of a specified flow table, and the specified flow table is a start flow table that is in a pipeline and is used by the switch for reprocessing the packet.

The reprocessing module 306 is configured to reprocess the packet according to the packet processing instruction and starting at the specified flow table.

The reprocessing module 306 includes: a second obtaining unit 3063, a third obtaining unit 3064, and a second reprocessing unit 3065.

The second obtaining unit 3063 is configured to obtain the flow table identifier table_id of the current flow table for the packet in the processing process by using the buffer identifier.

The third obtaining unit 3064 is configured to obtain, from the buffer, a current packet obtained after the original packet is processed.

The second reprocessing unit 3065 is configured to send, according to the packet processing instruction, the current packet to a location that is in the pipeline and is indicated by the flow table identifier table id of the current flow table, so as to continue to perform processing, where the specified flow table is a flow table identified by the flow table identifier table id.

The flow table identifier table_id of the current flow table for the original packet in the processing process is obtained by using the buffer identifier; the current packet obtained after the original packet is processed is obtained from the buffer; and then, the current packet is sent to the location that is in the pipeline and is indicated by the flow table identifier table id of the current flow table, so as to continue to perform processing. In this manner, the packet may be avoided being reprocessed starting at a flow table at a first level, and time is saved. This manner is suitable for a situation in which some switches can perform insertion processing on the packet by using an intermediate flow table.

In this implementation manner of the present embodiments, a received original packet is stored in a buffer, and a buffer identifier is generated, the buffer identifier is carried in messages in a process of processing the packet according to a flow table, where a sent Packet_in message carries the buffer identifier, all or partial content of the packet, an input port number, and information obtained in the process of processing the packet, and a received Packet_out message carries the buffer identifier and a packet processing instruction; and the packet is reprocessed. A switch stores the received original packet into the buffer, and generates the buffer identifier, and both a sent message and a received message carry the buffer identifier. In this way, when requiring the original packet, the switch may obtain the original packet according to the buffer identifier, so that the switch can better and flexibly process the packet. In addition, the switch records a flow table identifier table_id of a current flow table, and stores the flow table identifier table_id into the buffer in which the buffer identifier has already been generated, so that the packet can be avoided being reprocessed starting at a flow table at a first level, and time is saved.

It should be noted that, in an actual application, modules or units of the switch in the foregoing implementation manner may be increased, decreased, or combined according to a specific situation. Details are not described herein.

Figure 14:
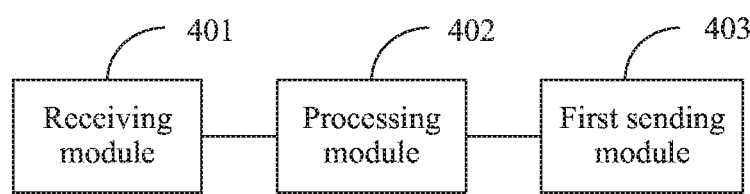
FIG. 14 is a schematic structural diagram of an implementation manner of a controller according to the present embodiments.

Referring to FIG. 14, FIG. 14 is a schematic structural diagram of an implementation manner of a controller according to the present embodiments. The controller includes: a receiving module 401, a processing module 402, and a first sending module 403.

It should be noted that, the controller in this implementation manner may perform steps in the method procedures in FIG. 6 to FIG. 8.

The receiving module 401 is configured to receive a first packet message Packet_in sent by a switch, where the first packet message is used to report information about a packet to the controller, and request the controller to determine a processing method for the packet, the first packet message carries a buffer identifier, all or partial content of the packet, an input port number, and information obtained in a process of processing the packet, original content of the packet is an original packet, and the buffer identifier is used to identify a buffer location of the original packet.

The first packet message Packet_in refers to a message for reporting, by the switch, the information about the packet to the controller, and the information may be a packet processing success, a packet processing failure, a current processing state, or the like. In a scenario in which the packet fails to match a flow entry, the switch may report the event to the controller by using the first packet message Packet_in, and request the controller to determine the processing method for the packet. Alternatively, when the switch needs to send a message to the controller, the switch may report the event to the controller by using the first packet message Packet_in.

The first packet message carries the buffer identifier, and this helps the controller to add the buffer identifier into a second packet message when the controller sends the second packet message to the switch. The buffer identifier is used to identify the buffer location of the original packet.

The first packet message further includes all or partial content of the packet, the input port number, and the information obtained in the process of processing the packet. All or partial content of the packet may be all content or partial content of the original packet, a modified packet, a modification record of the packet, and the like. The input port number is used to identify the switch. The information obtained during packet processing may be used to provide additional information to which the controller can make reference, and helps the controller to perform analysis processing on the packet.

The processing module 402 is configured to perform analysis processing on the information about the packet, so as to generate a packet processing instruction.

The first sending module 403 is configured to send a second packet message Packet_out to the switch, where the second packet message is used to deliver, to the switch, the packet processing instruction for processing the packet, the second packet message carries the buffer identifier and the packet processing instruction, the packet processing instruction includes indication information of a specified flow table, and the specified flow table is a start flow table that is in a pipeline and is used by the switch for reprocessing the packet.

The second packet message Packet_out is used by the controller for sending, to the switch, the packet processing instruction for processing the packet, and is a message in response to the first packet message Packet_in. The packet processing instruction includes the indication information of the specified flow table, and the specified flow table is the start flow table that is in the pipeline and is used by the switch for reprocessing the packet. For example, when the packet needs to be reprocessed, the specified flow table may be a flow table at a first level; when the packet needs to be processed starting at the flow table that the packet fails to match, the specified flow table may be the flow table that the packet fails to match. The packet processing instruction is carried in the second packet message. The first packet message Packet_in carries the buffer identifier, and the second packet message Packet_out is a message in response to the first packet message Packet_in, and also carries the buffer identifier, so that when requiring the original packet after receiving the second packet message Packet_out, the switch can obtain the original packet by using the buffer identifier.

In this implementation manner of the present embodiments, a controller receives a first packet message Packet_in sent by a switch, where the Packet_in message carries a buffer identifier, all or partial content of a packet, an input port number, and information obtained in a process of processing the packet; performs analysis processing on information about the packet, so as to generate a packet processing instruction; and sends a second packet message Packet_out to the switch, where the second packet message carries the buffer identifier and the packet processing instruction. Both a received message and a sent message carry the buffer identifier. In this way, when requiring the original packet, the switch may obtain the original packet according to the buffer identifier, so that the switch can flexibly process the packet according to an instruction of the controller.

Figure 15:
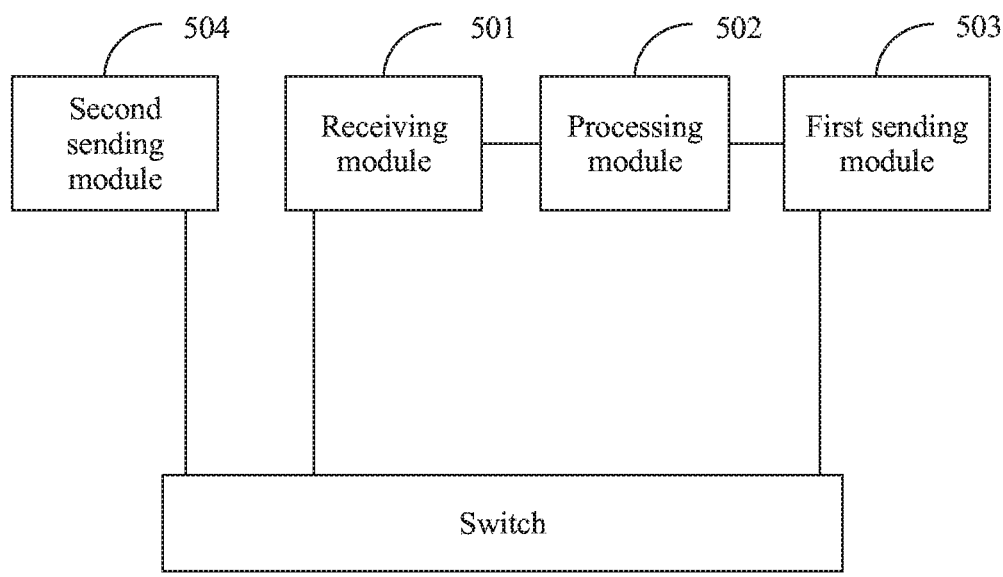
FIG. 15 is a schematic structural diagram of another implementation manner of a controller according to the present embodiments.
Figure 16:
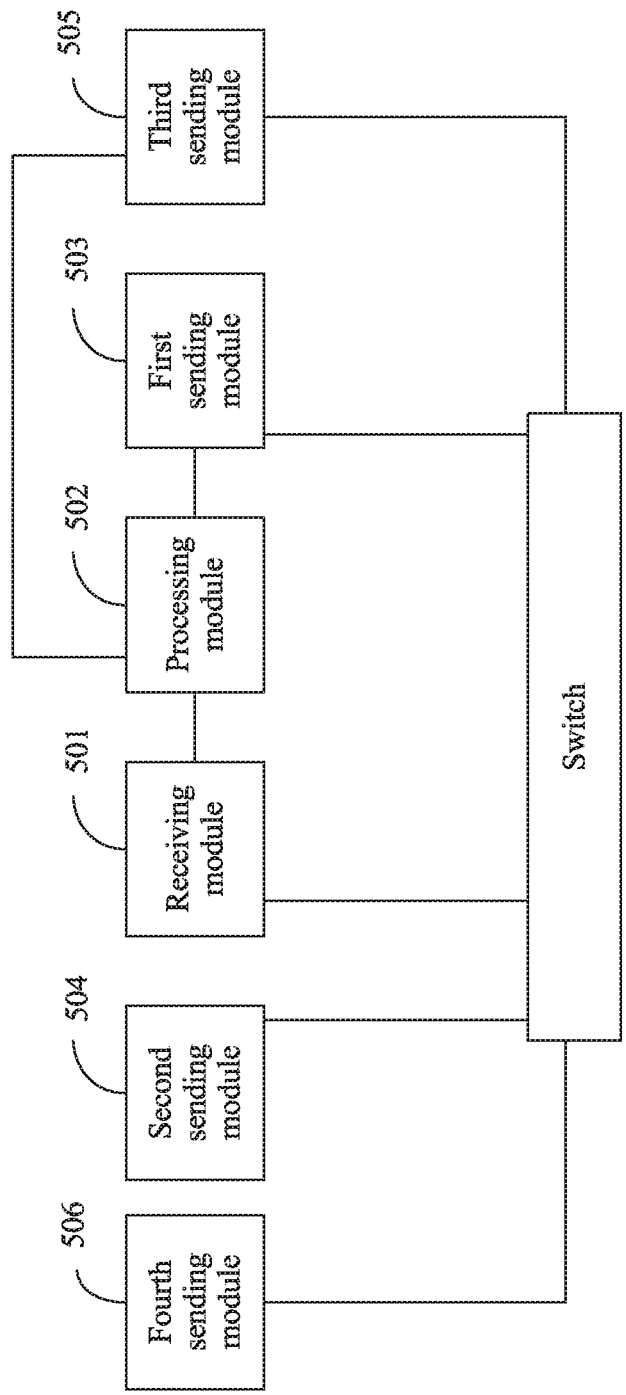
FIG. 16 is a schematic structural diagram of still another implementation manner of a controller according to the present embodiments.

Referring to FIG. 15 and FIG. 16, FIG. 15 and FIG. 16 are schematic structural diagrams of two other implementation manners of a controller according to the present embodiments. The controller in this implementation manner is basically the same as the controller in FIG. 14. For same parts, refer to FIG. 14 and relevant written description; and for different parts, refer to the following specific content.

The controller includes: a receiving module 501, a processing module 502, a first sending module 503, a second sending module 504, a third sending module 505, and a fourth sending module 506.

It should be noted that, the switch in this implementation manner may perform steps in the method procedures in FIG. 7 and FIG. 8.

The second sending module 504 is configured to send a buffer instruction to a switch, where the buffer instruction instructs the switch to store original content that is of a packet and is specified by the controller.

The original content of the packet is an original packet. That is, the switch may determine, according to the buffer instruction of the controller, whether to buffer the original packet.

The fourth sending module 506 is configured to send a carry original packet instruction to the switch, where the carry original packet instruction instructs the switch to add an original packet into a first packet message when the switch sends the first packet message.

Before the controller receives the first packet message, if the controller requires the original packet, the sent carry original packet instruction instructs the switch to add the original packet into the first packet message when the switch sends the first packet message.

The receiving module 501 is configured to receive the first packet message Packet_in sent by the switch, where the first packet message is used to report information about the packet to the controller, and request the controller to determine a processing method for the packet, the first packet message carries a buffer identifier, all or partial content of the packet, an input port number, and information obtained in a process of processing the packet, the original content of the packet is the original packet, and the buffer identifier is used to identify a buffer location of the original packet.

When the controller includes the fourth sending module 506, the information related to the packet refers to all of the original packet obtained by using the buffer identifier, a part of the original packet, or a transformation of the original packet.

The processing module 502 is configured to perform analysis processing on the information about the packet, so as to generate a packet processing instruction. When the controller includes the fourth sending module 506, the processing module 502 specifically performs analysis processing on all of the original packet, a part of the original packet, or a transformation of the original packet, so as to generate the packet processing instruction.

The third sending module 505 is configured to send, to the switch, an instruction for performing an addition, deletion, or modification operation on a flow entry.

The first sending module 503 is configured to send a second packet message Packet_out to the switch, where the second packet message is used to deliver, to the switch, the packet processing instruction for processing the packet, the second packet message carries the buffer identifier and the packet processing instruction, the packet processing instruction includes indication information of a specified flow table, and the specified flow table is a start flow table that is in a pipeline and is used by the switch for reprocessing the packet.

When the controller includes the fourth sending module 506, the information related to the packet refers to all of the original packet obtained by using the buffer identifier, a part of the original packet, or a transformation of the original packet.

In this implementation manner of the present embodiments, a controller receives a first packet message Packet_in sent by a switch, where the Packet_in message carries a buffer identifier, all or partial content of a packet, an input port number, and information obtained in a process of processing the packet; performs analysis processing on information about the packet, so as to generate a packet processing instruction; and sends a second packet message Packet_out to the switch, where the second packet message carries the buffer identifier and the packet processing instruction. Both a received message and a sent message carry the buffer identifier. In this way, when requiring the original packet, the switch may obtain the original packet according to the buffer identifier, so that the switch can flexibly process the packet according to an instruction of the controller. In addition, the controller sends a buffer instruction, so that the switch can selectively buffer the original packet; and the controller sends a carry original packet instruction, so that all of the original packet, a part of the original packet, or a transformation of the original packet can be sent to the controller, and the controller obtains packet information that is complete enough, and correctly determines processing on the packet.

Figure 17:
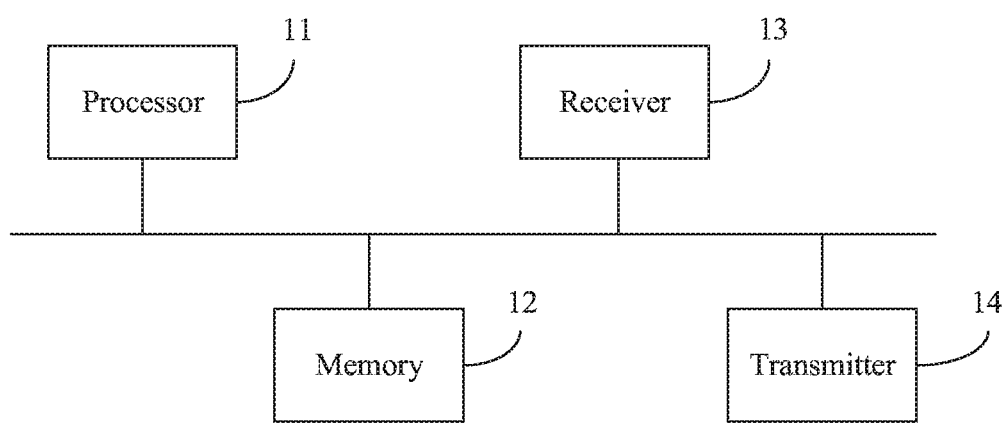
FIG. 17 is a schematic structural diagram of a physical entity in an implementation manner of a switch according to the present embodiments.

Referring to FIG. 17, FIG. 17 is a schematic structural diagram of a physical entity in an implementation manner of a switch according to the present embodiments. The switch includes a processor 11, and a memory 12, a receiver 13, and a transmitter 14 that are coupled to the processor 11.

It should be noted that, the switch in this implementation manner may perform steps in the method procedures in FIG. 1 to FIG. 5A and FIG. 5B.

The receiver 13 is configured to receive a packet, where original content of the packet is an original packet.

The memory 12 is configured to: store the original packet, and identify a buffer location of the original packet by using a buffer identifier, and the memory 12 is further configured to store a flow table.

The processor 11 is configured to process the packet according to a pipeline.

The transmitter 14 is configured to: when the packet fails to match a flow table, send a first packet message Packet_in to a controller, where the first packet message is used to report information about the packet to the controller, and request the controller to determine a processing method for the packet, and the first packet message carries the buffer identifier, all or partial content of the packet, an input port number, and information obtained in a process of processing the packet.

The receiver 13 is configured to: receive a second packet message Packet_out sent by the controller, where the second packet message is used to deliver, to the switch, a packet processing instruction for processing the packet, the second packet message carries the buffer identifier and the packet processing instruction, the packet processing instruction includes indication information of a specified flow table, and the specified flow table is a start flow table that is in the pipeline and is used by the switch for reprocessing the packet; and store the packet processing instruction into the memory 12.

The processor 11 is configured to: obtain the packet processing instruction by invoking the memory 12, and reprocess the packet according to the packet processing instruction and starting at the specified flow table.

In this implementation manner of the present embodiments, a switch stores a received original packet into a buffer, and generates a buffer identifier, the buffer identifier is carried in messages in a process of processing the packet according to a flow table, where a sent Packet_in message carries the buffer identifier and information related to the packet, and a received Packet_out message carries the buffer identifier and a packet processing instruction; and reprocesses the packet. The switch stores the received original packet into the buffer, and generates the buffer identifier, and both a sent message and a received message carry the buffer identifier. In this way, when requiring the original packet, the switch may obtain the original packet according to the buffer identifier, so that the switch can better process the packet.

Figure 18:
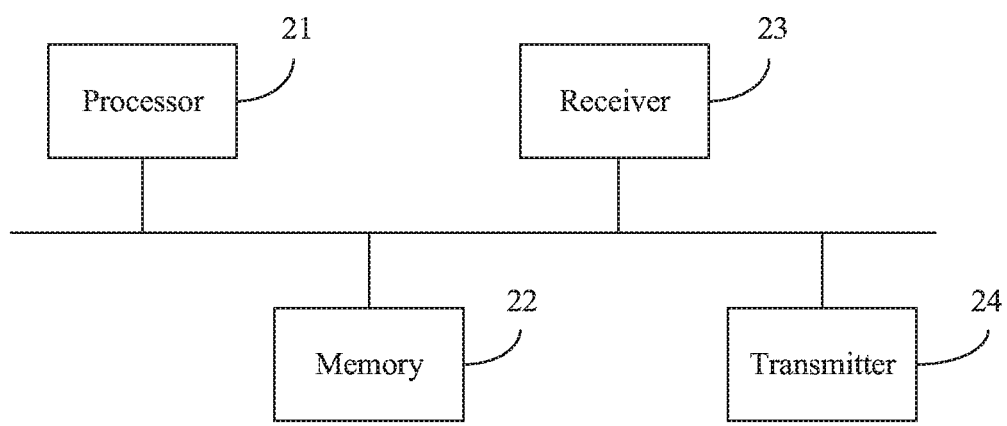
FIG. 18 is a schematic structural diagram of a physical entity in an implementation manner of a controller according to the present embodiments.

Referring to FIG. 18, FIG. 18 is a schematic structural diagram of a physical entity in an implementation manner of a controller according to the present embodiments. The controller includes a processor 21, and a memory 22, a receiver 23, and a transmitter 24 that are coupled to the processor 21.

It should be noted that, the controller in this implementation manner may perform steps in the method procedures in FIG. 6 to FIG. 8.

The receiver 23 is configured to: receive a first packet message Packet_in sent by a switch, and store the first packet message Packet_in into the memory 22, where the first packet message is used to report information about a packet to the controller, and request the controller to determine a processing method for the packet, the first packet message carries a buffer identifier, all or partial content of the packet, an input port number, and information obtained in a process of processing the packet, original content of the packet is an original packet, and the buffer identifier is used to identify a buffer location of the original packet.

The processor 21 is configured to: obtain, by invoking the memory 22, the information that is about the packet and is carried in the first packet message Packet_in, and perform analysis processing on the information about the packet, so as to generate a packet processing instruction.

The transmitter 24 is configured to send a second packet message Packet_out to the switch, where the second packet message is used to deliver, to the switch, the packet processing instruction for processing the packet, the second packet message carries the buffer identifier and the packet processing instruction, the packet processing instruction includes indication information of a specified flow table, and the specified flow table is a start flow table that is in a pipeline and is used by the switch for reprocessing the packet.

In this implementation manner of the present embodiments, a controller receives a first packet message Packet_in sent by a switch, where the Packet_in message carries a buffer identifier and information related to a packet; performs analysis processing on the information related to the packet, so as to generate a packet processing instruction; and sends a second packet message Packet_out to the switch, where the second packet message carries the buffer identifier and the packet processing instruction that is generated after the controller performs analysis processing on the information related to the packet. Both a received message and a sent message carry the buffer identifier. In this way, when requiring the original packet, the switch may obtain the original packet according to the buffer identifier, so that the switch can better process the packet.

In the several implementation manners provided in the present embodiments, it should be understood that the disclosed system, apparatus, and method may be implemented in other manners. For example, the described apparatus manner is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the implementation manners of the present embodiments may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present embodiments essentially, or the part contributing to the prior art, or all or a part of the technical solutions may be implemented in the form of a software product. The software product is stored in a storage medium and includes several instructions for instructing a computer device (which may be a personal computer, a server, a network device, or the like) or a processor to perform all or a part of the steps of the methods described in the implementation manners of the present embodiments. The foregoing storage medium includes: any medium that can store program code, such as a universal serial bus (USB) flash drive, a removable hard disk, a read-only memory (ROM), a random access memory (RAM), a magnetic disk, or an optical disc.

The foregoing descriptions are merely implementation manners of the present embodiments, and are not intended to limit the scope of the present embodiments. An equivalent structural or equivalent process alternation made by using the content of the specification and drawings of the present embodiments, or an application of the content of the specification and drawings directly or indirectly to another related technical field, shall fall within the protection scope of the present embodiments.

What is claimed is:

1. A method comprising:
    receiving, by a switch, an original packet;
    processing, by the switch, the original packet according to a pipeline, wherein the original packet is stored at a buffer location in a buffer, and a buffer identifier indicates the buffer location;
    sending, by the switch to a controller, a first packet message in response to the processed packet not matching a flow table, wherein the first packet message comprises processed packet information and causes the controller to determine a processing method for the processed packet, and wherein the first packet message further comprises the buffer identifier and a portion of the processed packet;
    receiving, by the switch from the controller, a second packet message comprising a packet processing instruction and the buffer identifier, wherein the packet processing instruction comprises indication information of a specified flow table, and wherein the specified flow table is a start flow table that is in the pipeline; and
    reprocessing, by the switch, the original packet according to the packet processing instruction and starting at the specified flow table.

2. The method according to claim 1, further comprising:
    storing, by the switch, the original packet at the buffer location; and
    generating the buffer identifier, wherein the buffer identifier is carried in messages that are generated as part of processing the packet according to the flow table.

3. The method according to claim 1, wherein sending the first packet message to the controller comprises:
    receiving, by the switch from the controller, a carry original packet instruction message instructing the switch to add the original packet into the first packet message when the switch sends the first packet message;
    adding, by the switch, to the first packet message, the original packet, a portion of the original packet, or a transformation of the original packet, according to the carry original packet instruction message; and
    sending, by the switch to the controller, the first packet message.

4. The method according to claim 1, wherein reprocessing the original packet according to the packet processing instruction comprises:
    obtaining, by the switch, the original packet using the buffer identifier; and
    reprocessing, by the switch, the original packet according to the packet processing instruction and starting at the flow table at a first level, wherein the specified flow table is at the first level in the pipeline.

5. The method according to claim 1, wherein reprocessing the original packet according to the packet processing instruction comprises:
    obtaining, by the switch, a flow table identifier of a current flow table for the original packet using the buffer identifier;
    obtaining, by the switch from the buffer, a current packet obtained after the original packet is processed; and
    sending, by the switch according to the packet processing instruction, the current packet to a location that is in the pipeline and that is indicated by the flow table identifier of the current flow table to continue processing, wherein the specified flow table is identified by the flow table identifier.

6. The method according to claim 1, wherein before receiving the second packet message, the method further comprises:
    receiving, by the switch from the controller, an instruction message instructing the switch to perform an addition, a deletion, or a modification operation on the flow table; and performing the addition, the deletion, or the modification operation on the flow table according to the instruction message.

7. A method comprising:
receiving, by a controller from a switch, a first packet message comprising information of a processed packet, a buffer identifier, and a portion of the processed packet, and wherein the buffer identifier identifies a buffer location of an original version of the processed packet;
performing, by the controller, analysis processing on the information of the processed packet, and generating a packet processing instruction, in response to receiving the first packet message, wherein the packet processing instruction comprises indication information of a specified flow table, and the specified flow table is a start flow table that is in a pipeline; and
sending, by the controller to the switch, a second packet message comprising the packet processing instruction and the buffer identifier.

8. The method according to claim 7, further comprising:
sending, by the controller to the switch, a buffer instruction message, before receiving the first packet message, wherein the buffer instruction message instructs the switch to store original version of the processed packet in a buffer.

9. The method according to claim 7, further comprising:
sending, by the controller to the switch, an instruction message instructing the switch to perform an addition, deletion, or modification operation on the specified flow table, before sending the second packet message.

10. The method according to claim 7, further comprising:
sending, by the controller to the switch, a carry original packet instruction message, before receiving the first packet message, wherein the carry original packet instruction message instructs the switch to add the original version of the processed packet into the first packet message when the switch sends the first packet message.

11. A switch, comprising:
a processor; and
a non-transitory computer readable storage medium storing a program for execution by the processor, the program including instructions for:
processing an original packet according to a pipeline, wherein the original packet is stored at a buffer location in a buffer, and a buffer identifier indicates the buffer location;
sending, to a controller, a first packet message, in response to the processed packet not matching a flow table, wherein the first packet message comprises processed packet information and causes the controller to determine a processing method for the processed packet, and wherein the first packet message further comprises the buffer identifier and a portion of the processed packet;
receiving, from the controller, a second packet message comprising a packet processing instruction and the buffer identifier, wherein the packet processing instruction comprises indication information of a specified flow table, and wherein the specified flow table is a start flow table that is in the pipeline; and
reprocessing the original packet according to the packet processing instruction and starting at the specified flow table.

12. The switch according to claim 11, wherein the instructions further comprise instructions for:
storing the original packet at the buffer location; and
generating the buffer identifier, wherein the buffer identifier is carried in messages that are generated as part of processing the packet according to the flow table.

13. The switch according to claim 11, wherein the instructions further comprise instructions for:
receiving, from the controller, a carry original packet instruction message instructing the switch to add the original packet into the first packet message when the switch sends the first packet message;
adding to the first packet message the original packet, a portion of the original packet, or a transformation of the original packet, according to the carry original packet instruction message; and
sending, to the controller, the first packet message.

14. The switch according to claim 11, wherein the instructions for reprocessing the original packet according to the packet processing instruction comprises instructions for:
obtaining the original packet using the buffer identifier; and
reprocessing the original packet according to the packet processing instruction and starting at the flow table at a first level, wherein the specified flow table is at the first level in the pipeline.

15. The switch according to claim 11, wherein the instructions for reprocessing the original packet according to the packet processing instruction comprises instructions for:
obtaining a flow table identifier of a current flow table for the original packet using the buffer identifier;
obtaining from the buffer, a current packet obtained after the original packet is processed; and
sending according to the packet processing instruction, the current packet to a location that is in the pipeline and that is indicated by the flow table identifier of the current flow table to continue to perform processing, wherein the specified flow table is identified by the flow table identifier.

16. The switch according to claim 11, wherein the instructions further comprise instructions for:
receiving, from the controller, an instruction message instructing the switch to perform an addition, a deletion, or a modification operation on the flow table before receiving the second packet message; and
performing the addition, the deletion, or the modification operation on the flow table according to the instruction message.

17. A controller, comprising:
a processor; and
a non-transitory computer readable storage medium storing a program for execution by the processor, the program including instructions for:
receiving, from a switch, a first packet message comprising information of a processed packet, a buffer identifier, and a portion of the processed packet, and wherein the buffer identifier identifies a buffer location of an original version of the processed packet;
performing analysis processing on the information of the processed packet, and generating a packet processing instruction, in response to receiving the first packet message, wherein the packet processing instruction comprises indication information of a specified flow table, and the specified flow table is a start flow table that is in a pipeline; and
sending, to the switch, a second packet message comprising the packet processing instruction and the buffer identifier.

18. The controller according to claim 17, wherein the instructions further comprise instructions for:

sending, to the switch, a buffer instruction message, before receiving the first packet message, wherein the buffer instruction message instructs the switch to store original version of the processed packet in a buffer.

19. The controller according to claim 17, wherein the instructions further comprise instructions for:

sending, to the switch, an instruction message instructing the switch to perform an addition, a deletion, or a modification operation on the specified flow table, before sending the second packet message.

20. The controller according to claim 17, wherein the instructions further comprise instructions for:

sending, to the switch, a carry original packet instruction message, before receiving the first packet message, wherein the carry original packet instruction message instructs the switch to add the original version of the processed packet into the first packet message when the switch sends the first packet message.

* * * * *